US012532187B2

(12) United States Patent
Tarraf et al.

(10) Patent No.: US 12,532,187 B2
(45) Date of Patent: Jan. 20, 2026

(54) SYSTEMS AND METHODS FOR COMMUNICATION RESOURCE PLANNING FOR GROUND TO AERIAL VEHICLE COMMUNICATIONS

(71) Applicant: AURA Network Systems, Inc., McLean, VA (US)

(72) Inventors: Osama Hussein Tarraf, Fairfax, VA (US); Alistair Charles Peter Braden, Oxford (GB); Tamara Lynne Casey, Annapolis, MD (US); Shane David Chapman, Clinton, MT (US); Michael Robert Gagne, Monrovia, MD (US); Wayne E. Olson, Hillsborough, NC (US)

(73) Assignee: AURA Network Systems, Inc., McLean, VA (US)

( * ) Notice: Subject to any disclaimer, the term of this patent is extended or adjusted under 35 U.S.C. 154(b) by 231 days.

(21) Appl. No.: 18/350,700

(22) Filed: Jul. 11, 2023

(65) Prior Publication Data
US 2024/0089741 A1     Mar. 14, 2024

Related U.S. Application Data

(60) Provisional application No. 63/388,542, filed on Jul. 12, 2022.

(51) Int. Cl.
*H04W 16/18*     (2009.01)
*G08G 5/22*     (2025.01)
(Continued)

(52) U.S. Cl.
CPC .............. *H04W 16/18* (2013.01); *G08G 5/22* (2025.01); *G08G 5/34* (2025.01); *H04W 4/021* (2013.01);
(Continued)

(58) Field of Classification Search
CPC . H04W 16/18; H04W 4/021; H04W 72/0453; H04W 72/541; G08G 5/22; G08G 5/34; H04B 7/18506
See application file for complete search history.

(56) References Cited

U.S. PATENT DOCUMENTS

| 4,347,513 A | 8/1982 | Schindler |
| 6,018,659 A | 1/2000 | Ayyagari et al. |

(Continued)

FOREIGN PATENT DOCUMENTS

| CA | 2189494 A1 | 5/1997 |
| CN | 108173590 A | 6/2018 |

(Continued)

OTHER PUBLICATIONS

Final Office Action received for U.S. Appl. No. 17/580,292, mailed on Feb. 2, 2023, 25 pages.

(Continued)

*Primary Examiner* — Abdullahi Ahmed
(74) *Attorney, Agent, or Firm* — Kubota & Basol LLP

(57) ABSTRACT

Described herein are systems and methods for assigning and managing RF communication links between ground-based stations and airborne assets. In one or more examples, a pilot or other user of the systems and methods described herein can generate and transmit a flight plan to a spectrum management system. Additionally, or alternatively, the pilot or use can also transmit additional information to the spectrum management system such as the type of aircraft/radio configuration that they will be using during a flight, and a request for a certain amount of data throughput that they want to have access to during the flight. In one or more examples, upon receiving the flight plan and/or information from the pilot, the spectrum management system can proceed to match the user's desired flight plan with one or more (Continued)

RF spectrum resources for the airborne radio of the pilot's UAV to use during their planned flight.

45 Claims, 13 Drawing Sheets

(51) Int. Cl.
  *G08G 5/34* (2025.01)
  *H04W 4/021* (2018.01)
  *H04W 72/0453* (2023.01)
  *H04W 72/541* (2023.01)
(52) U.S. Cl.
  CPC ..... *H04W 72/0453* (2013.01); *H04W 72/541* (2023.01)

(56) References Cited

U.S. PATENT DOCUMENTS

| | | | |
|---|---|---|---|
| 6,163,681 | A | 12/2000 | Wright et al. |
| 6,167,239 | A | 12/2000 | Wright et al. |
| 6,944,475 | B1 | 9/2005 | Campbell |
| 8,615,263 | B2 | 12/2013 | Madon et al. |
| 8,897,770 | B1 | 11/2014 | Frolov et al. |
| 8,914,022 | B2 | 12/2014 | Kostanic et al. |
| 9,185,603 | B1 | 11/2015 | Mccarthy |
| 9,319,172 | B2 | 4/2016 | Jalali et al. |
| 9,596,053 | B1 | 3/2017 | Marupaduga et al. |
| 9,734,723 | B1 | 8/2017 | Bruno et al. |
| 10,202,190 | B2 | 2/2019 | Tao et al. |
| 10,205,508 | B1 | 2/2019 | Lindsley et al. |
| 10,304,343 | B2 | 5/2019 | Mustafic et al. |
| 10,354,536 | B1 | 7/2019 | Hegranes et al. |
| 10,372,122 | B2 | 8/2019 | Zach |
| 10,531,505 | B2 | 1/2020 | Gagne |
| 10,880,070 | B1 | 12/2020 | Delaney et al. |
| 11,283,529 | B2 * | 3/2022 | De Rosa ............... H04W 4/44 |
| 11,603,200 | B2 | 3/2023 | Bruhn |
| 11,657,720 | B2 * | 5/2023 | Takács ............... H04B 7/18506 370/254 |
| 11,804,141 | B2 | 10/2023 | Chase et al. |
| 2001/0052875 | A1 | 12/2001 | Kohno et al. |
| 2005/0108374 | A1 | 5/2005 | Pierzga et al. |
| 2007/0072560 | A1 | 3/2007 | Ishikawa |
| 2008/0274734 | A1 | 11/2008 | Kostanic et al. |
| 2010/0234024 | A1 | 9/2010 | Mcguffin |
| 2011/0116373 | A1 | 5/2011 | Lauer |
| 2011/0257874 | A1 | 10/2011 | Judd et al. |
| 2012/0270531 | A1 | 10/2012 | Wright et al. |
| 2012/0282962 | A1 | 11/2012 | Madon et al. |
| 2014/0024365 | A1 | 1/2014 | Mitchell |
| 2014/0274103 | A1 | 9/2014 | Steer et al. |
| 2015/0139073 | A1 | 5/2015 | Buchwald et al. |
| 2016/0119938 | A1 | 4/2016 | Frerking et al. |
| 2016/0275801 | A1 | 9/2016 | Kopardekar |
| 2017/0059688 | A1 | 3/2017 | Gan |
| 2017/0111271 | A1 | 4/2017 | Thubert et al. |
| 2017/0215178 | A1 | 7/2017 | Kim et al. |
| 2017/0278410 | A1 | 9/2017 | Byers et al. |
| 2017/0293307 | A1 | 10/2017 | Frolov et al. |
| 2018/0061251 | A1 | 3/2018 | Venkatraman et al. |
| 2018/0113206 | A1 | 4/2018 | Pokrass et al. |
| 2018/0164441 | A1 | 6/2018 | Feria et al. |
| 2018/0189312 | A1 | 7/2018 | Alas et al. |
| 2018/0231655 | A1 | 8/2018 | Stark et al. |
| 2018/0324881 | A1 | 11/2018 | Gagne |
| 2018/0375568 | A1 | 12/2018 | De Rosa et al. |
| 2019/0012923 | A1 | 1/2019 | Weisbrod et al. |
| 2019/0041835 | A1 | 2/2019 | Cella et al. |
| 2019/0260462 | A1 | 8/2019 | Axmon et al. |
| 2019/0306675 | A1 | 10/2019 | Xue et al. |
| 2019/0323833 | A1 * | 10/2019 | Herriot ................. G01B 21/16 |
| 2019/0331800 | A1 | 10/2019 | Espeland et al. |
| 2020/0043351 | A1 | 2/2020 | Hunter |
| 2020/0104294 | A1 | 4/2020 | Alas et al. |
| 2020/0154426 | A1 | 5/2020 | TakÁcs et al. |
| 2020/0184739 | A1 | 6/2020 | Nathan et al. |
| 2020/0258405 | A1 | 8/2020 | Fern et al. |
| 2020/0266903 | A1 * | 8/2020 | De Rosa ............ H04B 7/18506 |
| 2020/0372808 | A1 | 11/2020 | Carraway et al. |
| 2021/0035457 | A1 | 2/2021 | Pennapareddy |
| 2021/0118312 | A1 | 4/2021 | TakÁcs |
| 2021/0241632 | A1 | 8/2021 | Mustafic et al. |
| 2021/0282129 | A1 | 9/2021 | Kim et al. |
| 2022/0138236 | A1 * | 5/2022 | Jones ..................... G06F 16/29 455/456.1 |
| 2022/0148434 | A1 * | 5/2022 | Vivanco .................. G08G 5/57 |
| 2022/0166525 | A1 | 5/2022 | De Rosa et al. |
| 2022/0217706 | A1 * | 7/2022 | Casey ................... H04W 72/51 |
| 2022/0302968 | A1 | 9/2022 | Casey et al. |
| 2022/0383760 | A1 | 12/2022 | Casey et al. |
| 2023/0208506 | A1 | 6/2023 | Ji et al. |
| 2023/0245571 | A1 | 8/2023 | Casey et al. |
| 2024/0224309 | A1 | 7/2024 | Casey et al. |
| 2025/0052887 | A1 | 2/2025 | Gagne et al. |
| 2025/0071511 | A1 * | 2/2025 | Branscomb ......... H04L 61/5007 |
| 2025/0112685 | A1 | 4/2025 | Gagne et al. |
| 2025/0280431 | A1 | 9/2025 | Casey et al. |

FOREIGN PATENT DOCUMENTS

| | | |
|---|---|---|
| CN | 109450515 A | 3/2019 |
| CN | 112116830 A | 12/2020 |
| EP | 1485729 B1 | 5/2008 |
| EP | 1975822 A1 | 10/2008 |
| KR | 1788721 B1 | 10/2017 |
| WO | 2007/020475 A1 | 2/2007 |
| WO | 2016/030656 A1 | 3/2016 |
| WO | 2018/178750 A1 | 10/2018 |
| WO | 2019/086821 A1 | 5/2019 |
| WO | 2020/113062 A1 | 6/2020 |
| WO | 2020/200410 A1 | 10/2020 |
| WO | 2020/263393 A9 | 2/2021 |
| WO | 2022/217530 A1 | 10/2022 |
| WO | 2023/049588 A1 | 3/2023 |
| WO | 2023/194013 A1 | 10/2023 |

OTHER PUBLICATIONS

Final Office Action received for U.S. Appl. No. 17/569,379, mailed on Jul. 26, 2023, 22 pages.
Final Office Action received for U.S. Appl. No. 17/829,887, mailed on Aug. 30, 2024, 26 pages.
International Search Report received for PCT Patent Application No. PCT/US2022/070050, mailed on Apr. 19, 2022, 4 pages.
International Search Report received for PCT Patent Application No. PCT/US2022/070272, mailed on Apr. 22, 2022, 5 pages.
International Search Report received for PCT Patent Application No. PCT/US2022/072699, mailed on Sep. 21, 2022, 5 pages.
International Search Report received for PCT Patent Application No. PCT/US2023/060402, mailed on Mar. 21, 2023, 5 pages.
International Search Report received for PCT Patent Application No. PCT/US2023/069999, mailed on Oct. 31, 2023, 5 pages.
International Search Report received for PCT Patent Application No. PCT/US2024/029807, mailed on Sep. 24, 2024, 6 pages.
Non-Final Office Action received for U.S. Appl. No. 17/580,292, mailed on Jun. 26, 2023, 26 pages.
Non-Final Office Action received for U.S. Appl. No. 17/580,292, mailed on Oct. 3, 2022, 24 pages.
Non-Final Office Action received for U.S. Appl. No. 17/569,379, mailed on Mar. 3, 2023, 21 pages.
Non-Final Office Action received for U.S. Appl. No. 17/829,887, mailed on Apr. 16, 2024, 25 pages.
Non-Final Office Action received for U.S. Appl. No. 18/152,608, mailed on Sep. 27, 2024, 14 pages.
Notice of Allowance received for U.S. Appl. No. 17/569,379, mailed on Dec. 19, 2023, 11 pages.
Notice of Allowance received for U.S. Appl. No. 17/580,292, mailed on Nov. 8, 2023, 8 pages.

(56) References Cited

OTHER PUBLICATIONS

Notice of Allowance received for U.S. Appl. No. 18/608,692, mailed on Oct. 7, 2024, 13 pages.

Apaza, et al., A New Spectrum Management Concept For Future NAS Communications, 2020 AIAA/IEEE 39th Digital Avionics Systems Conference (DASC), San Antonio, TX, USA, 2020, pp. 1-7.

Jacob, et al., Cognitive Radio for Aeronautical Communications: A Survey, IEEE Access, vol. 4, May 19, 2016, pp. 3417-3443.

Jacob, et al., Efficient Aviation Spectrum Management Through Dynamic Frequency Allocation, IEEE, 2015, pp. L3-1-L3-9.

Kampichler, et al., Location Based Communication Services for UAS in the NAS, 2016 IEEE/AIAA 35th Digital Avionics Systems Conference (DASC), 2016, pp. 1-7.

Knoblock, et al., Investigation and Evaluation of Advanced Spectrum Management Concepts for Aeronautical Communications, 2021 Integrated Communications Navigation and Surveillance Conference (ICNS), 2021, pp. 1-12.

Mulkerin, L-Band Commercial Communications Service for Unmanned Aircraft Systems, 2007 Integrated Communications, Navigation and Surveillance Conference, 2007, pp. 1-8.

Reyes, et al., A Cognitive Radio System for Improving the Reliability and Security of UAS/UAV Networks, IEEE, 2015, 9 pages.

Ribeiro, et al., A Framework for Dimensioning VDL-2 Air-ground Networks, 2014 Integrated Communications, Navigation and Surveillance Conference (ICNS) Conference Proceedings, Apr. 2014, pp. Q3-1-Q3-14.

Wang, et al., Blockchain Enabled Verification for Cellular-Connected Unmanned Aircraft System Networking, Future Generation Computer Systems, May 2021, pp. 233-244.

Corrected Notice of Allowability received for U.S. Appl. No. 18/608,692, mailed on Jan. 13, 2025, 2 pages.

Notice of Allowance received for U.S. Appl. No. 17/829,887, mailed on Jan. 30, 2025, 11 pages.

Notice of Allowance received for U.S. Appl. No. 18/152,608, mailed on Feb. 13, 2025, 8 pages.

International Search Report received for PCT Patent Application No. PCT/US2024/049839, mailed on Jan. 13, 2025, 5 pages.

\* cited by examiner

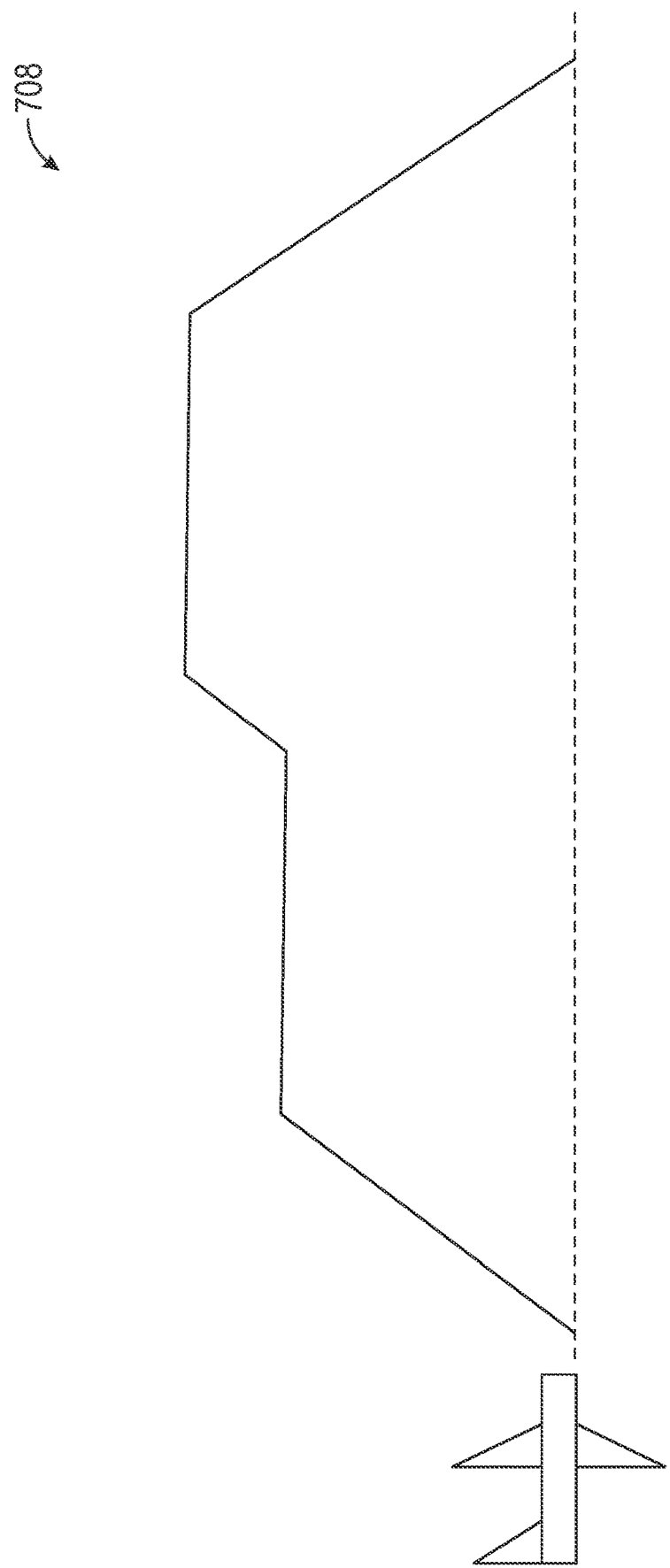

SYSTEMS AND METHODS FOR COMMUNICATION RESOURCE PLANNING FOR GROUND TO AERIAL VEHICLE COMMUNICATIONS

CROSS-REFERENCE TO RELATED APPLICATIONS

This application claims the benefit of U.S. Provisional Application No. 63/388,542, filed Jul. 12, 2022, the content of which is herein incorporated by reference in its entirety for all purposes.

FIELD

This disclosure relates to RF spectrum management in an air to ground communications network, and more specifically, to systems and methods for mission-based communications resource planning for ground to aerial vehicle communications operating in an aviation communications network.

BACKGROUND

One of the critical features of air safety for both manned and unmanned flights is the ability for airborne assets to communicate with the ground to relay operationally critical communications. Ensuring that an airborne asset can maintain a continuous and uninterrupted communications link to the ground ensures that the airborne asset is able to receive necessary information from ground controllers as well as transmit necessary information to the ground controllers at all points during a given flight.

The proliferation of airborne assets, and specifically unmanned aerial vehicles (UAVs) has complicated the task of ensuring that each airborne asset has continuous communications channel with a ground station. UAVs are now capable of flying long distances across a broad array of geographic areas, all the while having specialized communications requirements with the ground. For instance, UAV operators based on the ground must be in constant communication with the UAV not only to provide instructions to the UAV from the ground, but to also receive critical telemetry from the UAV that informs the ground-based operator about the UAV's operational status. Additionally, a UAV being operated by a remote pilot may also need a voice communications link established between a pilot of the UAV and an air traffic controller who can provide instructions to the pilot during the flight of the UAV.

Ensuring the performance of the critical data link between a ground base station and remote radios for aviation operations in airspace is critical to supporting the safety requirements of manned, unmanned and optionally piloted flights. Data links must meet the reliability, integrity and availability performance targets set forth by regulators. Ensuring a continuous data link for remote radios can be challenging in an environment in which there are many airborne assets transiting an airspace at any given time. The availability of RF spectrum specifically can be a challenging issue. With increasing air traffic comes an increasing potential for the communications of one aircraft to interfere with the communications of another during a flight. Network interference (i.e., interference within a specific regional area) can further be exacerbated when aircraft operating in the network are transiting across large geographic areas and thus must rely on multiple ground base stations during its flight to maintain a continuous communications link with the ground.

When planning a mission using a unmanned aerial aircraft, not only does the flight path, altitude, and speed need to be planned in advance to ensure that an aircraft can complete a given mission, it can be also imperative to include as part of the plan, an RF communications plan for the flight. The RF plan can outline the RF spectrum resources that a given flight will use while executing its flight plan. Providing an RF plan to complement a physical flight plan can be challenging, as a given flight plan may traverse multiple parts of an aviation network, and the RF spectrum availability across the network may be dynamically changing at any moment during a given flight. Thus, in one or more examples, a system which can input a specification of a mission to be flown and which can determine if the mission is feasible from an RF communications standpoint and further provide a plan for RF spectrum access to the mission is needed.

SUMMARY

Disclosed herein are systems and methods for flight-plan based RF resource planning. In one or more examples, the systems and methods described herein can receive a specification of a flight in one or more forms including a fully developed flight plan in which the flight plan specifies the intended geographic path, altitude, and speed. Additionally, or alternatively, the systems and methods can receive a more generalized mission specification in which the objectives of the flight are identified, but the specific route, altitude speed, etc., are not specified. In one or more examples, the receive flight specification can be used to generate an RF resource plan for the mission. In one or more examples, the RF resource plan can determine the RF spectrum resources that a given mission will utilize while executing a given flight plan, at any given moment during execution of the flight plan.

In one or more examples, the systems and methods can receive a flight plan that includes a geographic route that the flight is to take, as well as the planned altitude, speed, and other information pertaining to the performance of the flight. In one or more examples, the systems and methods herein can perform an initial analysis of the flight plan to ensure that the planned flight will be within the RF coverage area of an aviation network at all points during the flight. Additionally or alternatively, the systems and methods described herein can receive a more generalized specification of a flight mission in which the exact geographic route, altitude, speed is not provided, and can use the more generalized flight plan to provide an RF coverage plan for the flight.

In one or more examples, a method for allocating radio frequency (RF) spectrum traffic resources in an air-to-ground communications network comprises: receiving a flight plan from a user, wherein the flight plan comprises timing, location, and altitude information for an aircraft that is to fly in one or more coverage areas of the air-to-ground communications network, generating a three-dimensional model of the received flight plan, wherein the three-dimensional flight plan includes geographic location information and altitude information for the flight, dividing the generated three-dimensional model into one or more portions, associating one or more geofences with each of the one or more portions of the three-dimensional model, wherein each geofence of the one or more geofences represents a geographic range and an altitude range, and wherein the portion of the generated three-dimensional model associated with a geofence includes geographic location information and altitude information that falls with the geographic range and altitude range of its associated geofence, for each geofence associated with a portion of the generated three-dimensional model, determining one or more viable RF traffic resources to be used by the aircraft to communicate with one or more base stations of the communications network when the aircraft is flying through the geographic range and altitude range represented by the geofence, and generating an RF coverage plan for the aircraft based on the determined one or more viable RF traffic resources for each geofence associated with a portion of the generated three-dimensional model, wherein an RF coverage plan comprises an assignment of at least one RF traffic resource to be used by the aircraft and the one or more base stations of the communications network during execution of the received flight plan.

Additionally or alternatively, associating one or more geofences with each of the one or more portions of the three-dimensional model comprises: dividing the one or more coverage areas of the air-to-ground communications network into a plurality of geofences, with each geofence associated with a geographic range and altitude range of the one or more coverage areas, and associating each portion of the three-dimensional model with one or more of the plurality of geofences based on whether a geographic range and an altitude range associated with the portion of the three-dimensional model falls within the geographic range and altitude range of the one or more geofences.

Additionally or alternatively, associating one or more geofences with each of the one or more portions of the three-dimensional model comprises: for each portion of the one or more portions of the generated three-dimensional model: generating a geofence, wherein the generated geofence comprises a geographic range and altitude range that encompasses a geographic range and altitude range of the portion of the three-dimensional model.

Additionally or alternatively, determining one or more viable RF traffic resources to be used by the aircraft to communicate with one or more base stations of the communications network when the aircraft is flying through the geographic range and altitude range represented by the geofence comprises: selecting an RF traffic resource from a plurality of RF traffic resources, generating one or more link budgets based on the selected RF traffic resource and the geographic and altitude ranges associated with the geofence, and determining whether the selected RF traffic resource is viable based on the generated one or more link budgets.

Additionally or alternatively, generating one or more link budgets based on the selected RF traffic resource and the geographic and altitude ranges associated with the geofence comprises generating a link budget for communications transmitted from a base station of the communication network to the aircraft.

Additionally or alternatively, generating one or more link budgets based on the selected RF traffic resource and the geographic and altitude ranges associated with the geofence comprises generating a link budget for communications transmitted from the aircraft to the base station of the communication network.

Additionally or alternatively, the one or more link budgets is configured to determine whether a signal transmitted by a transmitter will reach a receiver with a power level that is above a pre-determined threshold.

Additionally or alternatively, the one or more link budgets is configured to determine whether a signal transmitted by a transmitter will reach a receiver with a signal-to-noise ratio that is above a pre-determined threshold.

Additionally or alternatively, generating an RF coverage plan for the aircraft based on the determined one or more viable RF traffic resources for each geofence associated with a portion of the generated three-dimensional model comprises: for each geofence associated with a portion of the generated three-dimensional model, selecting a viable RF traffic resource of the determined one or more viable resources.

Additionally or alternatively, selecting a viable RF traffic resource of the determined one or more viable resources is based on minimizing a number of times that the aircraft will switch traffic resources used during execution of the flight plan.

Additionally or alternatively, selecting a viable RF traffic resource of the determined one or more viable resources is based on maximizing a signal to noise ratio associated with a communications channel between the base station and the aircraft.

Additionally or alternatively, the method comprises notifying a user who submitted the flight plan if it is determined that there are no viable RF traffic resources for a given geofence of the one or more geofences.

Additionally or alternatively, the method comprises generating a modification to the received plan if it is determined that there are no viable RF traffic resources for a given geofence of the one or more geofences.

In one or more examples, a system for allocating radio frequency (RF) spectrum traffic resources in an air-to-ground communications network comprises: a memory, one or more processors, wherein the memory stores one or more programs that when executed by the one or more processors, cause the one or more processors to: receive a flight plan from a user, wherein the flight plan comprises timing, location, and altitude information for an aircraft that is to fly in one or more coverage areas of the air-to-ground communications network, generate a three-dimensional model of the received flight plan, wherein the three-dimensional flight plan includes geographic location information and altitude information for the flight, divide the generated three-dimensional model into one or more portions, associate one or more geofences with each of the one or more portions of the three-dimensional model, wherein each geofence of the one or more geofences represents a geographic range and an altitude range, and wherein the portion of the generated three-dimensional model associated with a geofence includes geographic location information and altitude information that falls with the geographic range and altitude range of its associated geofence, for each geofence associated with a portion of the generated three-dimensional model, determine one or more viable RF traffic resources to be used by the aircraft to communicate with one or more base stations of the communications network when the aircraft is flying through the geographic range and altitude range represented by the geofence, and generate an RF coverage plan for the aircraft based on the determined one or more viable RF traffic resources for each geofence associated with a portion of the generated three-dimensional model, wherein an RF coverage plan comprises an assignment of at least one RF traffic resource to be used by the aircraft and the one or more base stations of the communications network during execution of the received flight plan.

Additionally or alternatively, associating one or more geofences with each of the one or more portions of the three-dimensional model comprises: dividing the one or more coverage areas of the air-to-ground communications network into a plurality of geofences, with each geofence associated with a geographic range and altitude range of the one or more coverage areas, and associating each portion of the three-dimensional model with one or more of the plurality of geofences based on whether a geographic range and an altitude range associated with the portion of the three-dimensional model falls within the geographic range and altitude range of the one or more geofences.

Additionally or alternatively, associating one or more geofences with each of the one or more portions of the three-dimensional model comprises: for each portion of the one or more portions of the generated three-dimensional model: generating a geofence, wherein the generated geofence comprises a geographic range and altitude range that encompasses a geographic range and altitude range of the portion of the three-dimensional model.

Additionally or alternatively, determining one or more viable RF traffic resources to be used by the aircraft to communicate with one or more base stations of the communications network when the aircraft is flying through the geographic range and altitude range represented by the geofence comprises: selecting an RF traffic resource from a plurality of RF traffic resources, generating one or more link budgets based on the selected RF traffic resource and the geographic and altitude ranges associated with the geofence, and determining whether the selected RF traffic resource is viable based on the generated one or more link budgets.

Additionally or alternatively, generating one or more link budgets based on the selected RF traffic resource and the geographic and altitude ranges associated with the geofence comprises generating a link budget for communications transmitted from a base station of the communication network to the aircraft.

Additionally or alternatively, generating one or more link budgets based on the selected RF traffic resource and the geographic and altitude ranges associated with the geofence comprises generating a link budget for communications transmitted from the aircraft to the base station of the communication network.

Additionally or alternatively, the one or more link budgets is configured to determine whether a signal transmitted by a transmitter will reach a receiver with a power level that is above a pre-determined threshold.

Additionally or alternatively, the one or more link budgets is configured to determine whether a signal transmitted by a transmitter will reach a receiver with a signal-to-noise ratio that is above a pre-determined threshold.

Additionally or alternatively, generating an RF coverage plan for the aircraft based on the determined one or more viable RF traffic resources for each geofence associated with a portion of the generated three-dimensional model comprises: for each geofence associated with a portion of the generated three-dimensional model, selecting a viable RF traffic resource of the determined one or more viable resources.

Additionally or alternatively, selecting a viable RF traffic resource of the determined one or more viable resources is based on minimizing a number of times that the aircraft will switch traffic resources used during execution of the flight plan.

Additionally or alternatively, selecting a viable RF traffic resource of the determined one or more viable resources is based on maximizing a signal to noise ratio associated with a communications channel between the base station and the aircraft.

Additionally or alternatively, the one of more processors are caused to notify a user who submitted the flight plan if it is determined that there are no viable RF traffic resources for a given geofence of the one or more geofences.

Additionally or alternatively, the one or more processors are caused to generate a modification to the received plan if it is determined that there are no viable RF traffic resources for a given geofence of the one or more geofences.

A non-transitory computer readable storage medium storing one or more programs for allocating RF spectrum channels in an air-to-ground communications network, for execution by one or more processors of an electronic device that when executed by the device, cause the device to: receive a flight plan from a user, wherein the flight plan comprises timing, location, and altitude information for an aircraft that is to fly in one or more coverage areas of the air-to-ground communications network, generate a three-dimensional model of the received flight plan, wherein the three-dimensional flight plan includes geographic location information and altitude information for the flight, divide the generated three-dimensional model into one or more portions, associate one or more geofences with each of the one or more portions of the three-dimensional model, wherein each geofence of the one or more geofences represents a geographic range and an altitude range, and wherein the portion of the generated three-dimensional model associated with a geofence includes geographic location information and altitude information that falls with the geographic range and altitude range of its associated geofence, for each geofence associated with a portion of the generated three-dimensional model, determine one or more viable RF traffic resources to be used by the aircraft to communicate with one or more base stations of the communications network when the aircraft is flying through the geographic range and altitude range represented by the geofence, and generate an RF coverage plan for the aircraft based on the determined one or more viable RF traffic resources for each geofence associated with a portion of the generated three-dimensional model, wherein an RF coverage plan comprises an assignment of at least one RF traffic resource to be used by the aircraft and the one or more base stations of the communications network during execution of the received flight plan.

Additionally or alternatively, associating one or more geofences with each of the one or more portions of the three-dimensional model comprises: dividing the one or more coverage areas of the air-to-ground communications network into a plurality of geofences, with each geofence associated with a geographic range and altitude range of the one or more coverage areas, and associating each portion of the three-dimensional model with one or more of the plurality of geofences based on whether a geographic range and an altitude range associated with the portion of the three-dimensional model falls within the geographic range and altitude range of the one or more geofences.

Additionally or alternatively, associating one or more geofences with each of the one or more portions of the three-dimensional model comprises: dividing the one or more coverage areas of the air-to-ground communications network into a plurality of geofences, with each geofence associated with a geographic range and altitude range of the one or more coverage areas, and associating each portion of the three-dimensional model with one or more of the plurality of geofences based on whether a geographic range and an altitude range associated with the portion of the three-dimensional model falls within the geographic range and altitude range of the one or more geofences.

Additionally or alternatively, associating one or more geofences with each of the one or more portions of the three-dimensional model comprises: for each portion of the one or more portions of the generated three-dimensional model: generating a geofence, wherein the generated geofence comprises a geographic range and altitude range that encompasses a geographic range and altitude range of the portion of the three-dimensional model.

Additionally or alternatively, determining one or more viable RF traffic resources to be used by the aircraft to communicate with one or more base stations of the communications network when the aircraft is flying through the geographic range and altitude range represented by the geofence comprises: selecting an RF traffic resource from a plurality of RF traffic resources, generating one or more link budgets based on the selected RF traffic resource and the geographic and altitude ranges associated with the geofence, and determining whether the selected RF traffic resource is viable based on the generated one or more link budgets.

Additionally or alternatively, generating one or more link budgets based on the selected RF traffic resource and the geographic and altitude ranges associated with the geofence comprises generating a link budget for communications transmitted from a base station of the communication network to the aircraft.

Additionally or alternatively, generating one or more link budgets based on the selected RF traffic resource and the geographic and altitude ranges associated with the geofence comprises generating a link budget for communications transmitted from the aircraft to the base station of the communication network.

Additionally or alternatively, the one or more link budgets is configured to determine whether a signal transmitted by a transmitter will reach a receiver with a power level that is above a pre-determined threshold.

Additionally or alternatively, the one or more link budgets is configured to determine whether a signal transmitted by a transmitter will reach a receiver with a signal-to-noise ratio that is above a pre-determined threshold.

Additionally or alternatively, generating an RF coverage plan for the aircraft based on the determined one or more viable RF traffic resources for each geofence associated with a portion of the generated three-dimensional model comprises: for each geofence associated with a portion of the generated three-dimensional model, selecting a viable RF traffic resource of the determined one or more viable resources.

Additionally or alternatively, selecting a viable RF traffic resource of the determined one or more viable resources is based on minimizing a number of times that the aircraft will switch traffic resources used during execution of the flight plan.

Additionally or alternatively, selecting a viable RF traffic resource of the determined one or more viable resources is based on maximizing a signal to noise ratio associated with a communications channel between the base station and the aircraft.

Additionally or alternatively, the device is caused to notify a user who submitted the flight plan if it is determined that there are no viable RF traffic resources for a given geofence of the one or more geofences.

Additionally or alternatively, the devices is caused to generate a modification to the received plan if it is determined that there are no viable RF traffic resources for a given geofence of the one or more geofences.

BRIEF DESCRIPTION OF THE FIGURES

The invention will now be described, by way of example only, with reference to the accompanying drawings, in which:

FIGS. 7A-7B illustrate an exemplary flight plan according to examples of the disclosure.

DETAILED DESCRIPTION

Figure 1:
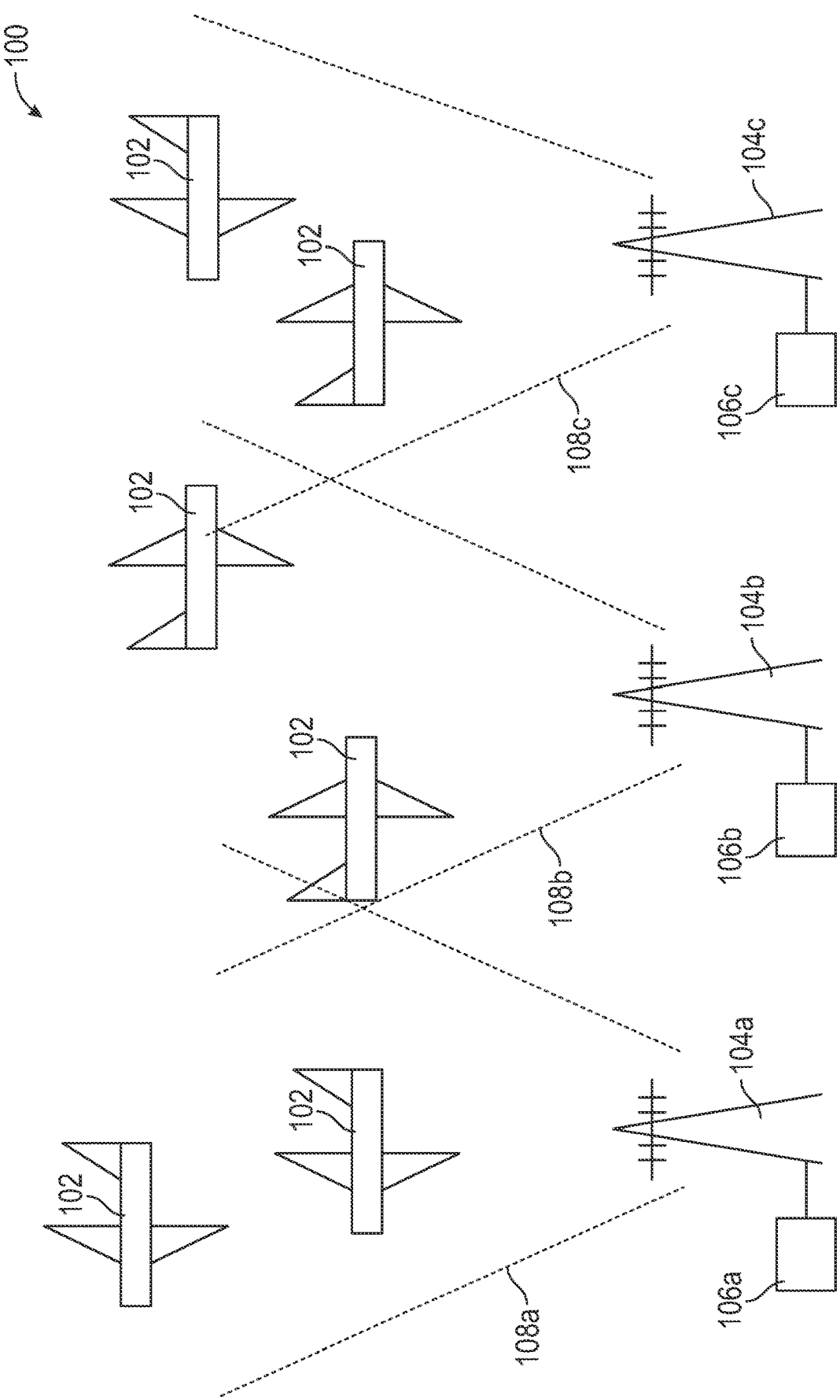
FIG. 1 illustrates a ground to air network according to examples of the disclosure.

Reference will now be made in detail to implementations and examples of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods for assigning and managing RF communications between ground-based stations and airborne assets. In one or more examples of the disclosure, a pilot or other user of the systems and methods described herein can generate and transmit a flight plan to a spectrum management system. Additionally, or alternatively, the pilot or user can also transmit additional information to the spectrum management system such as the type of aircraft/radio configuration that they will be using during a flight, and a request for a minimum data throughput that they want to have during the flight.

In one or more examples, upon receiving the flight plan and/or information from the pilot, the spectrum management system can proceed to match the user's desired flight plan with one or more RF spectrum resources for the airborne radio of the pilot's UAV to use during their planned flight. As described in further detail below, the selection of the slot for the pilot's use by the spectrum management system can be based on the information and flight plan submitted by the pilot, as well as other factors such as predictions about RF spectrum interference that may occur during the flight, RF coverage prediction, and RF spectrum availability in the geographic area or areas that the aircraft will traverse during their flight.

According to various examples, once the RF spectrum slot or slots has been selected for a given flight plan, the spectrum management system can also be configured to implement a communications link between the pilot/operator and the aircraft using the RF spectrum slot assigned to the aircraft and its flight plan. In one or more examples, the spectrum management system can configure the communications link between an operator and a plane by applying the chosen RF spectrum slot to a ground base station and selecting other parameters associated with the communications link.

In the following description of the various examples, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices. Additionally, terms such as "plane" or "aircraft" are equivalent to "UAV" and "pilot" is equivalent to "user" or "operator". The concept of a user extends beyond a human and encompasses a computer or a network. Further, "air-to-ground" is equivalent to "ground-to-air".

The present disclosure in some examples also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any programming language. It will be appreciated that a variety of programming languages may be used to implement the teachings of the present disclosure as described herein.

When an aircraft is in-flight, it is critical that the aircraft have a reliable and continuous communication link with the ground. For instance, in the context of unmanned aerial vehicles (UAVs) in which an aircraft is flown and controlled from the ground by an operator, the operator will need to be continuously updated with information regarding the status of the UAV. In order to facilitate unmanned flight, UAVs must have continuous contact with operators on the ground so that they can receive instructions and also so that they can transmit vital telemetry information to let the operators know the status of the flight. However, as air traffic increases across the world, providing a reliable and continuous communications link to an aircraft for the entire duration of its flight can become a complicated endeavor. A ground-to-air communications network can include many aircraft, ground stations, and geographic areas that need to be coordinated so as to ensure that every single aircraft in the network can be provided with a reliable and continuous communications channel during its flight.

FIG. 1 illustrates a ground to air network according to examples of the disclosure. The example of FIG. 1 illustrates an exemplary communications network 100 that can be configured to provide communications between one or more ground base stations 104a-c and one or more aircraft 102 in-flight. In one or more examples, the communications network 100 can include one or more ground base stations 104a-c. Each of the ground base stations 104a-c include one or more antennas configured to transmit communications from the ground to the one or more aircraft 102. In one or more examples, each ground base station 104a-c can be configured to provide transmissions within a coverage area 108a-c. For example, ground base station 104a can be configured to transmit RF spectrum radio signals over geographic coverage area 108a. Ground base station 104b can be configured to transmit RF spectrum radio signals over geographic coverage area 108b, and ground base station 104c can be configured to transmit RF spectrum radio signals over geographic coverage area 108c. In one or more examples, geographic coverage areas 108a-c can be three-dimensional areas that not only cover a certain range of latitude and longitude, but also provide coverage to areas from the ground or a minimum serviceable altitude up until a maximum serviceable altitude. In one or more examples, geographic coverage areas 108a-c can fully or partially overlap.

In one or more examples, each aircraft 102 can be handed over from one ground base station to the next during the duration of its flight or between multiple antennas of the same base station. For instance, at the beginning of a flight, ground base station 104a can be responsible for providing a communications channel between an operator on the ground and the aircraft while the aircraft 102 is within the coverage area 108a. If during the flight, the aircraft transits out of the coverage area 108a into coverage area 108b, then responsibility for providing the communications channel can transition from ground base station 104a to ground station 104b. If during the flight, the aircraft 102 transits out of coverage area 108b into coverage area 108c, then responsibility for providing the communications channel can transition from ground base station 104b to ground station 104c. In this way, the communications network 100 can be configured to ensure that an aircraft has an established communications channel with at least one ground base station at any point along its flight plan, so long as the flight plan passes through at least one coverage area at every point during its flight.

In one or more examples, each base station 104*a-c* can be communicatively coupled to a base station controller 106*a-c* respectively. Thus, in one or more examples, ground base station 104*a* can be communicatively coupled to base station controller 106*a*, ground base station 104*b* can be communicatively coupled to base station controller 106*b*, and ground base station 104*c* can be communicatively coupled to base station controller 106*c*. As described in further detail below, each base station controller can be configured to implement an RF based communications channel between a ground operator and an aircraft 102 when the aircraft is transiting through the coverage area 108*a-c* that corresponds to the base station that the controller is configured to operate. In one or more examples, implementing an RF based communications channel can include modulating signals transmitted by the operator using an RF spectrum frequency assigned to the aircraft 102, applying an appropriate modulation scheme to the transmitted signals, and applying any other physical layer communications protocols such as error correction codes.

In one or more examples, the goal of the communications network 100 can be to provide any given aircraft 102 operating within the network with a continuous and reliable RF communications channel throughout the duration of its flight. In one or more examples, providing continuous and reliable RF communications to an aircraft can include providing a single RF spectrum resource to an aircraft that it can reliably use throughout the duration of its flight to communicate with the ground. In one or more examples, each aircraft in a given airspace can communicate with the ground using a dedicated RF spectrum resource (i.e., a frequency range in the RF spectrum that is unique to the aircraft and can be only used by that individual aircraft to transmit and receive communications from the ground <notwithstanding time-domain multiplexing as per 057>). In order to facilitate efficient flight operations, in one or more examples, each ground base station 104*a-c* coupled to its corresponding base station controller 106*a-c* can be configured to ensure that each aircraft in its coverage area 108*a-c* is able to communicate with the ground using communications transmitted in the RF spectrum resource assigned to that aircraft.

Assigning to aircraft a dedicated RF spectrum resource to use throughout the duration of its flight can be difficult. Often times a given base station is responsible for providing communications channels to hundreds of flights at any given moment in time, with each aircraft in the coverage needing its own dedicated RF spectrum resource so that it can communicate with the ground uninterrupted by other air traffic in the air space. Furthermore, since flights can traverse multiple base stations during a given flight, assigning a dedicated RF spectrum to a flight that can be used throughout the flight's duration to have non-contended communications with the ground can require a high level of coordination to ensure that no two aircraft transit the same coverage area using the same RF spectrum resource. Furthermore, as the RF environment in a given coverage area is dynamic, not only is there a need to make sure that no two flights in a given coverage area operate on the same RF resource, but there is also a need to make sure that any communications between an aircraft and the ground will not be interfered with from various noise sources that can operate in a given coverage area. These noise sources can include the RF Noise Floor, related or unrelated network Co-Channel or Adjacent Channel Interference from other aircraft communications as well as Out of Band Interference sources.

In order to coordinate the assignment of RF spectrum channels to aircraft, in one or more examples, a system for Dynamic Spectrum Management that is configured to support safe aviation operations can be implemented to coordinate RF spectrum channel allocation to aircraft operating in a given communications network. In one or more examples, the spectrum management system can allocate the spectrum and traffic channels in a deterministic way to ensure the radio resources are available between the ground base station and the airborne radios operating on aircraft in the network.

Figure 2:
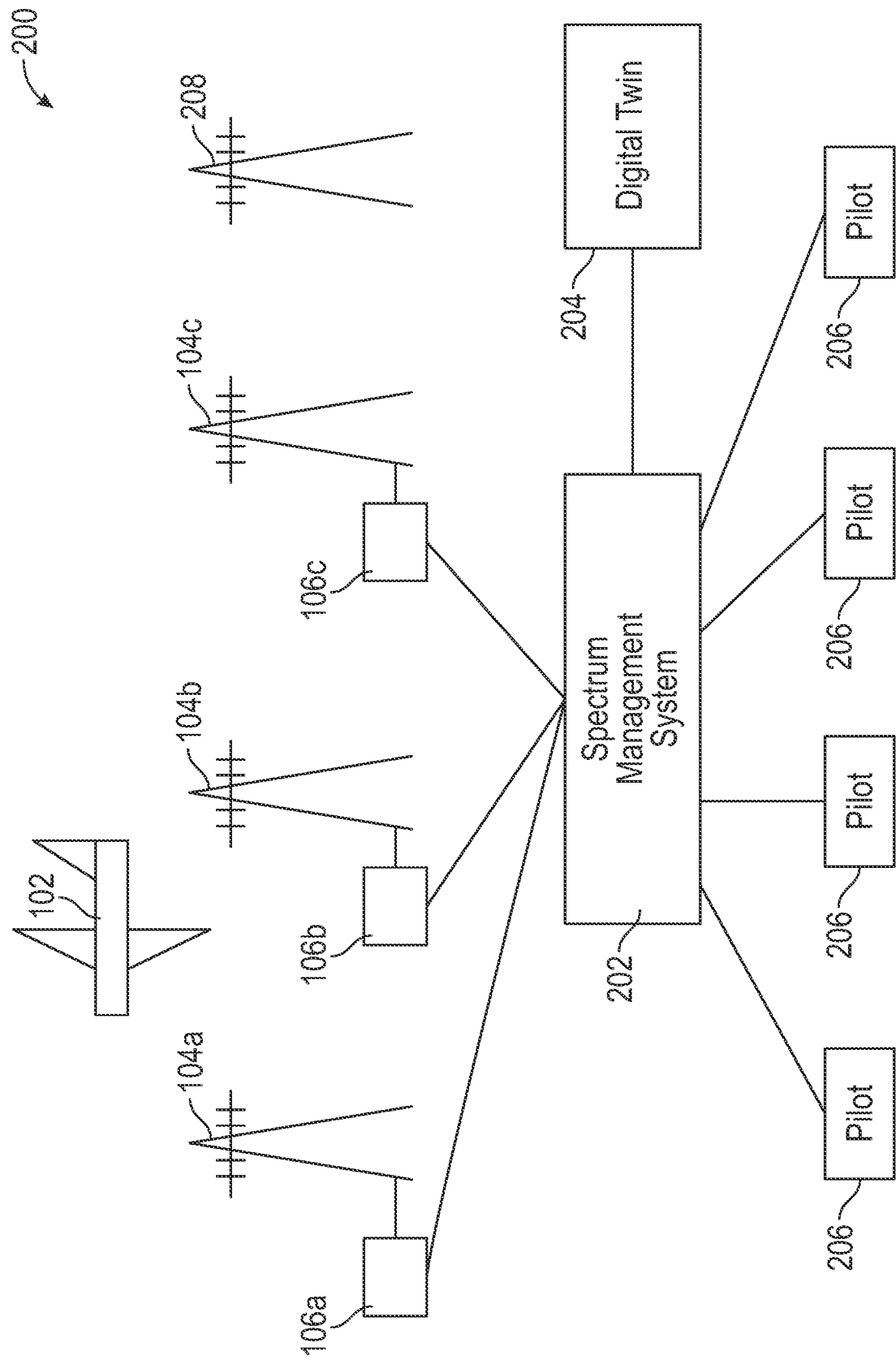
FIG. 2 illustrates an exemplary system for RF spectrum management of ground to air communication networks according to examples of the disclosure.

FIG. 2 illustrates an exemplary system for RF spectrum management of ground to air communication networks according to examples of the disclosure. In one or more examples of the disclosure, the communications network 200 of FIG. 2 can include the same components (i.e., aircraft 102, ground base stations 104*a-c*, and base station controller 106*a-c*) as the communications network 100 described above with respect to FIG. 1, but can also include one or more spectrum management system components (described in further detail below) that can manage the process of allocating RF spectrum channels to aircraft 102 in the network 200.

In one or more examples of the disclosure, one or more pilots/operators 206 can be connected to the network 200 in order to transmit data (such as command and control data) to or from the one or more aircraft. Each of the pilots 206 can be communicatively coupled to the network 200 through a spectrum management system 202 that can be configured to allocate RF spectrum resources to each of the aircraft 102 being controlled by the pilots 206. In one or more examples, the spectrum management system 202 can be configured to facilitate a communications link between each pilot 206 and their corresponding aircraft 102 by establishing an RF communications link using specified RF spectrum resources allocated to each aircraft.

In one or more examples of the disclosure, the spectrum management system can be configured to manage each communication link between an aircraft 102 and a pilot/operator 206 in real-time. Thus, in one or more examples, if the spectrum management system 202 determines that a given communications link has been compromised or had degraded, the spectrum management system 202 can take action to adjust the communications link to mitigate the issue. For instance, in one or more examples, if a given RF spectrum channel being used by an aircraft 102 is no longer performing satisfactorily or to required specifications, the spectrum channel management system 202 can change the RF spectrum resources (described in detail below) to alternative available resources in real-time to ensure that each aircraft maintains a reliable RF communications link. In one or more examples, if the pilot deviates from their advertised flight plan (for example by flying longer than anticipated, and/or by flying a different route than anticipated) the spectrum management system 202 can be configured to take action (for instance by switching the RF resources) to ensure that any interruptions to the communications channel are mitigated.

In one or more examples of the disclosure, in addition to managing communication channels in real-time, the spectrum management system 202 can be configured to allocate and reserve one or more RF spectrum resources for a given flight to be used during the duration of the flight. As described in further detail below, the spectrum management system 202 can receive a flight plan from a pilot/operator 206 and based on the filed flight plan as well as other factors can allocate RF spectrum resources to each flight in a deterministic manner that takes into account potential interference that may be encountered during the flight.

In one or more examples, and in addition to assigning traffic channels to aircraft for communications with the ground, the spectrum management system 202 can also be configured to assign traffic channels to one or more ground base stations for the purpose of broadcast/multi-cast services that airborne radios in communication with the ground base station can utilize to gain access to services such as aircraft altimeter updates, enhanced GPS (RTK), and other aviation related services. In one or more examples, the spectrum management system 202 can also assign spectrum resources to be allocated to the ground base station for dynamic allocation for on-demand request or spectrum resources from airborne radios that are in communication with the ground base station but in idle mode on the ground station control channel. Examples of the use of these resources include aircraft that are operational on other networks (i.e., cellular, satellite, or other public/private terrestrial networks) that are looking to transition for such a service to another aviation network. In one or more examples, in order to facilitate the transition, the ground base station can dynamically allocate spectrum resources at the request of the pilot to the real-time spectrum management system 202 and the ground base station. Once assigned the spectrum resource, the aircraft will continue flight operation on the allocated resources until the flight operation is complete or the resources are no longer needed (i.e., the aircraft has obtained service from another ground base station or other service provider). Once the resources are no longer needed, in one or more examples, the resources dynamically allocated to the aircraft can be returned to the dynamically allocated resource pool for future dynamic assignment to another aircraft needing a dynamically allocated resource. In one or more examples, in the case of a dynamically allocated resources as described above, the spectrum management system 202 can be aware of the flight plan filed for a given aircraft assigned a dynamic resource, even though the flight plan may be served by another network. In one or more examples, the spectrum management system 202 can be aware of the location of the airborne radio of an aircraft through connectivity along a control channel that can continually monitor the location of the aircraft while continuously updating the spectrum management system 202, as well as the beam forming antenna system both of which are prepared to provide a traffic channel upon request.

In one or more examples, the spectrum allocation process described above can be implemented by the spectrum management system 202 or can be processed in a separate component referred to herein as a "digital twin." Due to the large volume of information and the potential for spectrum and/or traffic channel requests by tens of thousands of end users in the a given airspace, a digital twin of the spectrum management system can be used to perform the required analysis without impacting the operational system. In one or more examples, and as illustrated in the example of FIG. 2, the digital twin 204 can be implemented separately from the spectrum management system 202 so as to reduce the processing load of the spectrum management system 202, thus leaving it free to perform the real-time operations associated with managing the active communications channels of aircraft transiting the airspace managed by the spectrum management system 202. Alternatively, the digital twin 204 can also be implemented as part of the spectrum management system such that both the real-time management of air communication links, and spectrum resource planning are performed by the same component.

In one or more examples, the digital twin 204 can be configured to receive one or more requests from the pilots 206 for spectrum to use during a given flight plan. The digital twin, using the flight plan provided by the pilot as well as other factors (described below) can determine what RF spectrum resources to allocate to an aircraft when its flight commences. Once requests are confirmed in the digital twin 204, execution and assignment of the communications channel on the operational spectrum management system 202 can be performed.

As described above, the spectrum management system 202 and the digital twin 204 can coordinate the RF spectrum needs of multiple aircraft in a given communications network so as to ensure that each individual aircraft can have access to a reliable and continuous communications channel with the ground during the entirety of its flight. In one or more examples, the spectrum management system 202 and the digital twin 204 can work in tandem to allocate and reserve RF spectrum channels for individual aircraft, and as described below, can monitor each individual communications link in-flight to ensure that the communications link is operating to its requirement.

Selecting an RF channel/traffic spectrum resource to allocate to a given flight can involve analyzing multiple variables to ensure that the selected channel will service the needs of an aircraft throughout the duration of its flight. In one or more examples, the spectrum management system 202 and the digital twin can analyze several variables such as the available spectrum resources, radio link throughput and performance requirements, location (including elevation), time-period as well as the radio frequency environment to assign a non-contended resource between the pilot and the aircraft. In one or more examples, the variables that influence channel selection can be populated by several internal and external components to the spectrum management system 202 that work together to match an aircraft to one or more RF channels for use during a flight as described below.

In one or more examples, the digital twin may use machine learning and/or predictive analytics to enhance its performance. In one or more examples, the digital twin may use machine learning and/or predictive analytics to predict the performance of aircraft given the influence of external factors. The external factors may include weather, airspeed, barometric pressure, and/or other factors that may impact flight performance and thus the predictability of the network. In one or more examples, the digital twin may use machine learning and/or predictive analytics to predict network interference based on external factors or flight performance.

In one or more examples, each pilot in the communications network can interface with the communications network before and during their flight via the spectrum management system 202 and the digital twin 204. Before the flight, and as described below, the pilot can interface with the spectrum management system and digital twin to receive an RF spectrum resource allocation for use during their flight based on their filed flight plan and other variables. During the flight, the spectrum management system 202 can provision the allocated RF spectrum channel to both the aircraft and the pilot to establish a continuous communications link and the spectrum management system can monitor the link during the flight to make sure it is performing within specification.

In one or more examples of the disclosure, the network 200 can include one or more base stations that are not connected to the spectrum management system 202. In one or more examples, a service provider who provides and maintains access to the spectrum management system 202 may not provide coverage to every desired geographic location. In one or more examples, in areas where a pilot may want to operate a flight but that does not fall within a coverage area of an existing base station, the service provider can provide the pilot with a temporary or portable base station 208. In one or more examples, the temporary/portable base station may not have a connection with the spectrum management system 202 and thus cannot receive/transmit information to the spectrum management system for the purposes of provisioning RF resources to aircraft.

In one or more examples, the temporary/portable base station 208 can be used to setup point-to-point and multipoint links between the temporary/portable base station 208 and one or more aircraft radios for flight operation. In one or more examples of the disclosure, the operator of unmanned aerial vehicles can inform the service provider of a "concept of operation" that describes the number of aircraft, the times they will fly and the spectrum resources they will require to communicate with the aircraft, which the service provider may use to inform the provision of temporary/portable base station 208. While the spectrum monitoring system 202 may not send real-time information to the temporary/portable base station 208, the spectrum management system 202 can use the concept of operation informing the provision of temporary/portable base station 208 to update the geofences (described in detail below) of the base stations 106a-c that are connected to the network and can work to ensure that flights that are flying within its network 200 do not cause harmful interference to, or receive harmful interference from, the flight operations of the temporary/portable base station 208. In one or more examples, the spectrum management system 202 can notify the operators of flights transiting the network 200 about the physical limitations to their operations caused by the temporary/portable base station 208 and can factor in the operations of the temporary/portable base station 208 when making RF spectrum resource allocations. In this way, while the spectrum management system 202 may not coordinate the operations of the temporary/portable base station 208, it can work to protect its own network (i.e., the base stations that are connected to the spectrum management system) from the operations of the temporary/portable base station's point-to-point operations.

Figure 3:
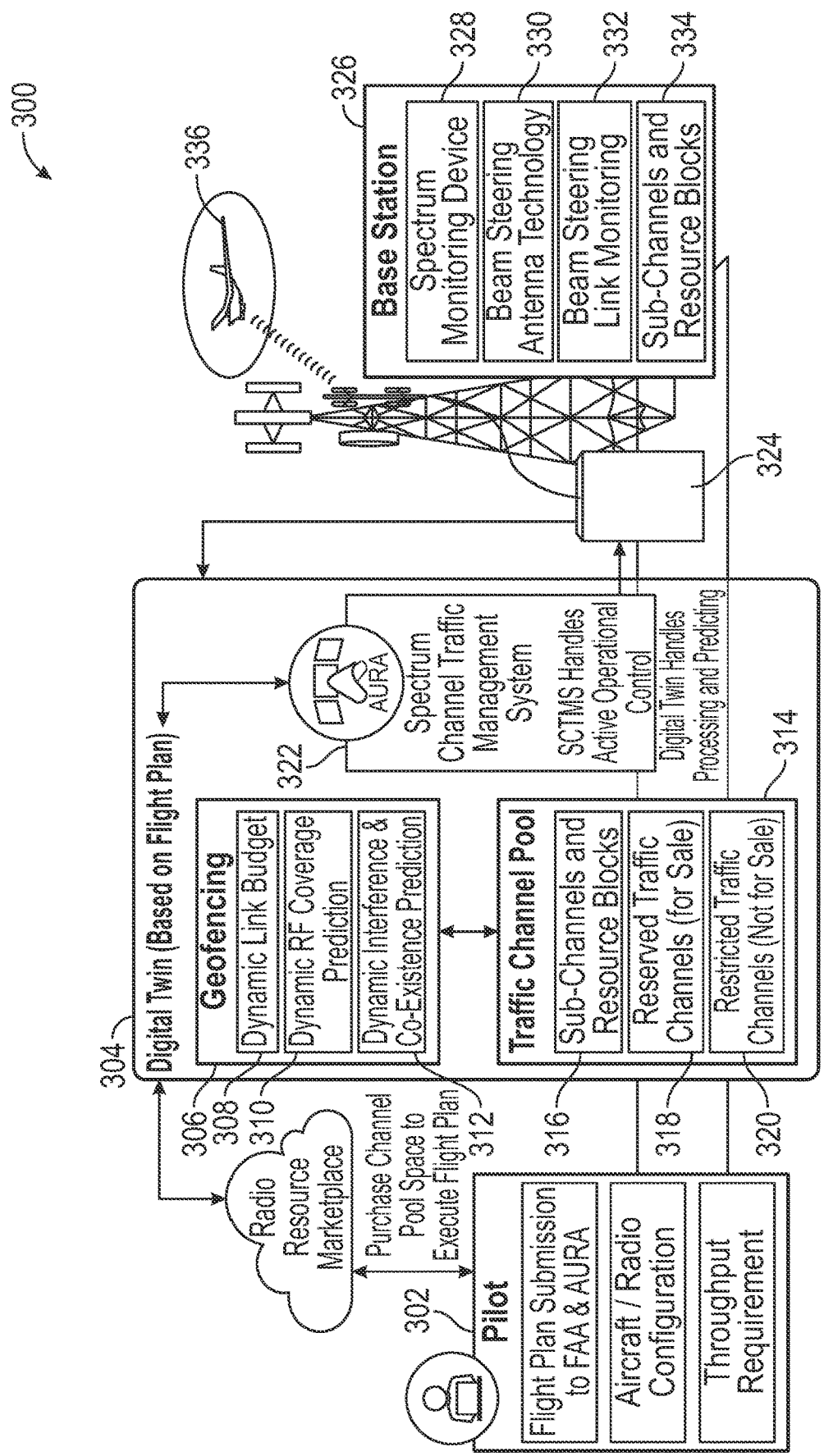
FIG. 3 illustrates an exemplary system for RF spectrum allocation and management according to examples of the disclosure.

FIG. 3 illustrates an exemplary system for RF spectrum allocation and management according to examples of the disclosure. In one or more examples, the system 300 can represent a single link of a communications network shown in FIGS. 1-2, and includes the components that manage the link between a pilot/end user 302 and an aircraft 336. In one or more examples of the disclosure, the planning, creation, and operation of the link between the pilot 302 and the aircraft 336 can begin with the pilot 302 submitting information about their proposed flight to the digital twin 304. In one or more examples, and as shown in FIG. 3, the information transmitted by the pilot 302 to the digital twin 304 can include a flight plan, an aircraft/radio configuration, and a throughput requirement.

In one or more examples, the flight plan submitted by the pilot 302 can include flight mission details such as the intended timing, altitude, location, and speed of the aircraft during a proposed flight. In one or more examples, the pilot 302 can submit the flight plan to both a regulatory body (such as the Federal Aviation Administration (FAA)) for approval and additionally send the flight plan to the spectrum management system via the digital twin 304 for the purpose of obtaining one or RF spectrum channels/resources for use during the proposed flight. In addition to the flight plan, the pilot 302 can send additional information to the digital twin 304 that the digital twin can use to select and allocate an RF spectrum channel to the user. For instance, in one or more examples, the pilot 304 can transmit the configuration of the aircraft or radio so as to inform the digital twin 304 as to the type of radio that the pilot will be communicating with during the flight. Knowledge of the radio configuration can allow for the digital twin 304 to not only understand the spectrum needs of the aircraft but can also allow for the digital twin to determine and predict other necessary information about the communications channel such as the modulation scheme and the forward error correction code that will be active in-flight.

In one or more examples of the disclosure, the pilot 302 can also transmit a throughput requirement to the digital twin 304. In one or more examples, the throughput requirement can represent the amount of data that is needed to be sent and received over the communications link. In one or more examples, the throughput can either be specified by the pilot 302 or can be derived based on the aircraft/radio configuration submitted by the pilot. For instance, in one or more examples, a particular aircraft (such as a UAV) may need a certain throughput of data for the channel to properly operate its autopilot features and thus by knowing the aircraft type, the system can derive the throughput requirements for that flight. As described in detail below, the throughput requirement can be used to determine the total amount of bandwidth for an RF spectrum channel and can thus inform the selection of a channel or channels that has an effective bandwidth to accommodate the throughput requirements of the flight.

As described above, the digital twin 104 can use the flight plan and other information transmitted to it by the pilot 302 as well as other information to select one or more RF spectrum channels/traffic resources for use by the pilot 302 during their flight. In one or more examples, the digital twin 104 can access a traffic channel pool 314 to determine the availability of RF spectrum channels to service a given flight. In one or more examples, the traffic channel pool 314 can represent all of the RF spectrum channels that could possibly be used to service a given flight. However, since there can be multiple aircraft in the network at any given time, and the need to reserve certain channels for emergency purposes (described in detail below), not every channel in the traffic channel pool 314 may be available for use by a particular aircraft during the times and locations required by a flight based on its flight plan.

Figure 4A:
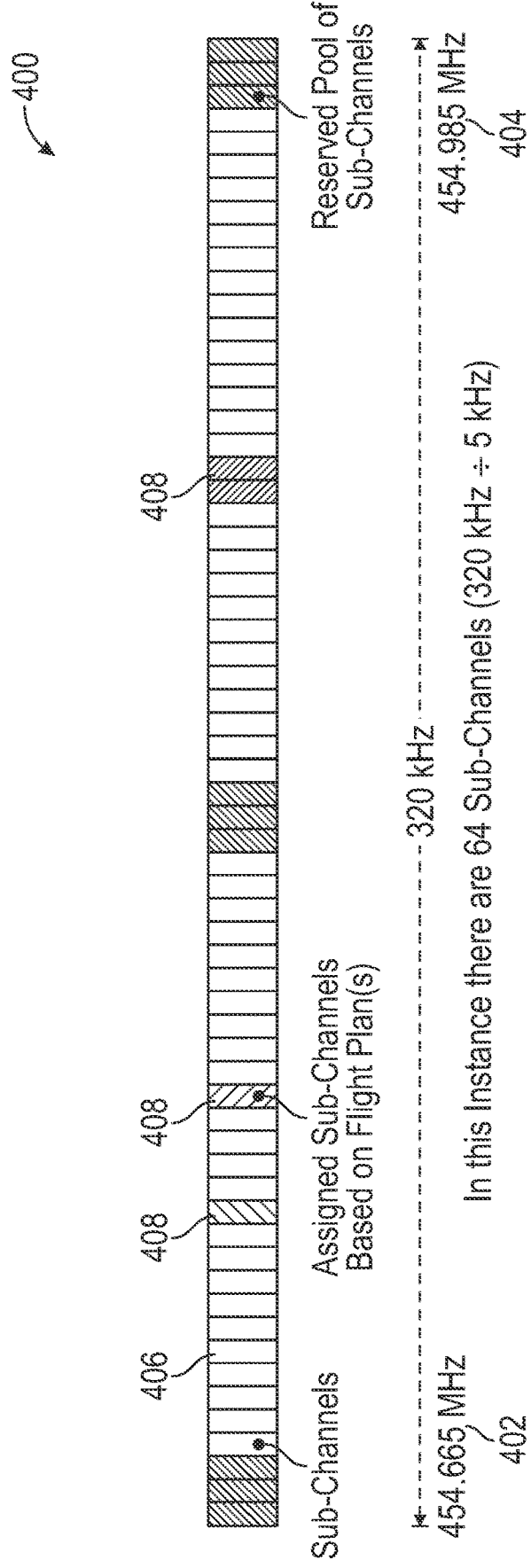
FIG. 4A illustrates an exemplary traffic channel pool according to examples of the disclosure.

FIG. 4A illustrates an exemplary spectrum resource pool according to examples of the disclosure. In one or more examples the spectrum resource pool 400 can include a minimum frequency 402 and a maximum frequency 404. The total range between the minimum frequency 402 and the maximum 404 can represent the total RF spectrum range of the network. In the example of FIG. 4A, the minimum frequency is shown as 454.665 MHz while the maximum frequency 404 is shown as 454.985 MHz meaning that the total RF spectrum range is 320 kHz. Each and every flight operated by the communications network must thus be allocated a channel within the 320 kHz frequency spectrum range. In one or more examples, a spectrum resource constitutes the dedicated use of a particular channel by a particular aircraft for the duration of its flight, or part thereof. The frequency values shown in the example of FIG. 4A are meant as examples only and should not be seen as limiting to the disclosure.

In one or more examples, the RF spectrum range created by the minimum frequency 402 and the maximum frequency 404 can be subdivided into one or more channels 406. Each channel 406 can represent the smallest sub-portion of the RF spectrum range that can be allocated to an individual user. In the example of FIG. 4A, the RF spectrum range of 320 kHz can be divided into 64 individual channels, with each channel representing a 5-kHz range. In one or more examples, the number of channels that a flight needs for its intended flight plan can be based on the throughput requirements defined by the user as described above. For instance, in one or more examples, if a user requires a bandwidth that is greater than what 5 kHz can serve, then the system can allocate multiple channels 406 to service the flight. For instance, if a flight needed 15 kHz of bandwidth based on its throughput requirements, then the system can allocate three adjacent or non-adjacent 5 kHz channels in the traffic channel pool 400 so that the flight can have a bandwidth allocation commensurate with its throughput requirements. The channel sizes and frequencies described above and throughout the application are meant as examples only and should not be construed as limiting as the techniques described throughout can be applied to different frequencies and channel sizes and still fall within the scope of the disclosure.

As described above, given that there may be multiple flights operating on a network at any given time, not every channel in the RF spectrum range of the spectrum resource pool 400 may be available to a given flight plan. Using the example of FIG. 4A, one or more channels 408 may have already been previously allocated to other flight plans and thus may be unavailable for allocation to a given user when deciding which channels to allocate. Additionally, in one or more examples, certain reserved channels 410 may be reserved for emergency uses and thus unavailable for allocation. For example, if during a flight the performance of a communication link using a particular channel/channels degrades due to unforeseen circumstances, then the system may switch the flight from its allocated channel/channels to one of the reserved channels 408 so that it can maintain a reliable communication link with the ground. In one or more examples, the traffic channel pool 400 can include one or more restricted channels (not pictured) that cannot be used by the system because use of those signals is prohibited by various standards and rules that may be imposed by a regulatory authority. In one or more examples, the traffic channel pool 400 one or more channels that are designated as "in use" because the particular channel is either being used by a currently operating flight plan, or will be in use by another flight plan at the time that the current flight being planned will be in operation. In one or more examples, the traffic channel pool 400 can be designated as a "dynamically assigned" channel. As described above, a dynamically assigned channel can be allocated to the ground base station for dynamic allocation to aircraft to communicate with the ground base station even though the flight may not be actively using the network that the ground base station is operating on. Examples of the use of these channels include aircraft that are operation on other networks (i.e., cellular, satellite, or other public/private terrestrial networks) that are looking to transition for such a service to another aviation network. In one or more examples, in order to facilitate the transition, the ground base station can dynamically allocate the channel at the request of the pilot to the real-time spectrum management system 202 and the ground base station. Once assigned the channel, the aircraft will continue flight operation on the allocated channel until the flight operation is complete or the channel is no longer needed (i.e., the aircraft has obtained service from another ground base station or other service provider). Once the channel is no longer needed, in one or more examples, the channel dynamically allocated to the aircraft can be returned to the dynamically allocated channel pool for future dynamic assignment to another aircraft needing a dynamically allocated channel. In one or more examples, in the case of a dynamically allocated channel as described above, the spectrum management system 202 can be aware of the flight plan filed for a given aircraft assigned a dynamic channel, even though the flight plan may be served by another network. In one or more example, the spectrum management system 202 can be aware of the location of the airborne radio of an aircraft through connectivity along a control channel that can continually monitor the location of the aircraft while continuously updating the spectrum management system 202, as well as the beam forming antenna system both of which are prepared to provide a traffic channel upon request. Thus, in one or more examples, the traffic channel pool 400 can have one more "dynamically assigned" channels that are reserved for use in the scenarios described above, and thus may not be available to be used for a flight that operating in the network.

Figure 4B:
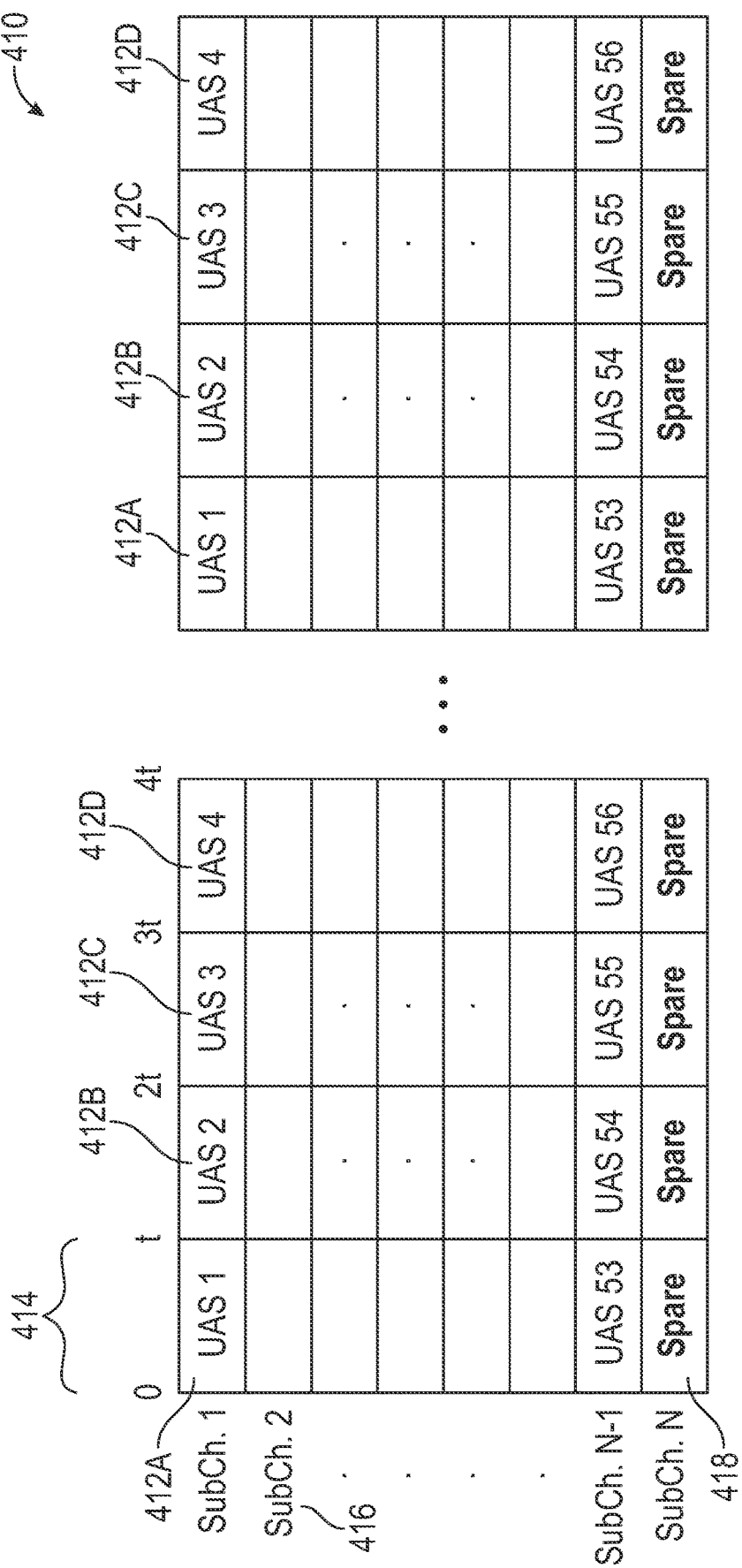
FIG. 4B illustrates another exemplary traffic channel pool according to examples of the disclosure.

The example of FIG. 4A described above provides an example of a traffic channel pool wherein each aircraft is assigned its own dedicated traffic channel for use to carry communications between a pilot and the UAV during a flight. However, this example should not be seen as limiting. For instance, in one or more examples, rather than assigning each UAV its own traffic channel, multiple UAV can share a single channel for instance by time multiplexing a channel amongst a plurality of UAV. FIG. 4B illustrates another exemplary traffic channel pool according to examples of the disclosure. In one or more examples, the traffic channel 410 can include multiple sub-channels 416 similar to the example of FIG. 4A and specifically channel 406 of FIG. 4A.

However, in contrast to the example of FIG. 4A, rather than assigning each UAV assigned to a base station its own individual channel, in one or more examples, multiple UAV can be assigned to the same channel 416. For instance, in one or more examples, and as illustrated in the example traffic channel pool 416 of FIG. 4B, multiple UAV can share a single sub-channel 416 using a system in which the communications of each UAV assigned to the same sub-channel is time multiplexed. For instance, in one or more examples, a particular sub-channel 416 can have a pre-defined plurality of time slots.

Looking at the example of FIG. 4B, in one or more examples, a sub-channel 416 can be divided into multiple time slots 414. In one or more examples, multiple UAV assigned to the same channel can transmit data during a time slot/slots allotted to them during a specific time. For instance, a sub-channel 416 (labeled SubCh 1, can be assigned to four different aircraft (UAV1-UAV4). In one or more examples, each aircraft can be assigned to a certain number of slots for a given sub-channel, for instance UAV 1 can be assigned slots 412A, UAV2 can be assigned slots 412B, UAV3 can be assigned slots 412C, and UAV4 can be assigned slots 412D. In one or more examples, each slot can be configured such that each UAV transmits once before any of the UAV assigned to a given sub-channel transmits for a second time in a given frame. In this way, each UAV assigned to a given sub-channel can transmit data within a given slot. For instance, UAV1-UAV4 can transmit data in a round-robin configuration such that each UAV1-UAV4 transmits during a slot before any of the UAV assigned to the channel transmits data during a second time slot.

In one or more examples, the size of a frame within a slot, and the size of the slots can be pre-defined. For instance, in one or more examples, the size of the frame can be pre-determined so as to optimize the balance between having a large frame that can improve channel performance (for instance to improve forward error correction (FEC) performance), and a small frame size that minimizes channel latency. In one or more examples, the frame size can also be determined by the hardware on either end of a communications channel. For instance, if a radio uses a frame size of 20 ms, then the frame size of the traffic channel pool 416 can be set to an integer multiple of the frame size of the radio (i.e., 80 ms). In one or more examples, the frame size and length of a time slot can be configurable by the user to meet the communication needs of the entity assigned to the slot. The example of FIG. 4B can thus allow for 4× the amount of UAV to use the traffic channel pool 410 in contrast with an example in which each sub-channel of the traffic channel pool is dedicated to a single aircraft. Similar to the example of FIG. 4A, one or more sub-channels 418 can be reserved (i.e., not assigned to any aircraft) to be kept in case of emergencies or for other reserved uses described above with respect to FIG. 4A. Furthermore, similar to the example of FIG. 4A, one or more sub-channels can also be assigned to a single UAV, while another sub-channel can be shared by multiple UAV.

In one or more examples, the spectrum resource pool 416 of FIG. 4B can represent a forward slot structure associated with transmissions from the ground to the aircraft. In one or more examples, the return slot structure (i.e., transmissions from the aircraft to the ground) can be almost identical to the forward frame structure except the return traffic associated with a particular aircraft can be allocated a different time slot than the time slot allocated to the aircraft in the forward frame in order to allow for half-duplex operation of the aircraft's radio. In one or more examples, the return slots can also be placed into a different RF sub-channel than the forward slots. In one or more examples, allowing a single RF channel to be divided in time by multiple aircraft can lead to increased spectral efficiency by allowing more aircraft to use the RF sub-channels of the traffic channel pool than if a single aircraft were assigned to its own dedicated RF sub-channel.

Returning to the example of FIG. 3, the digital twin 304 can select a channel or channels from the traffic channel pool 314, which as described above can include available sub-channels 316, reserved channels 318, and restricted traffic channels 320. However, in one or more examples, simply selecting an available sub-channel or channels for allocation may not mean that a communication link using that channel will be reliable throughout a flight. Various factors such as the predicted RF environment experienced during a flight or predicted interference can cause a given channel to fail during a flight. Thus, as part of the allocation process, the digital twin 304 can also perform an analysis to ensure that the channel will be available and perform to requirements throughout the duration of the flight as described below.

In order to allocate an RF channel to an aircraft, the digital twin 304, in one or more examples, can first predict if RF coverage is available for the aircraft during the entirety of its flight. To do so, in one or more examples, the digital twin 104 of the spectrum management system can "geofence" the coverage areas of each of the ground base stations in the network as shown at 306. In one or more examples, a "geofence" 306 can refer to a zone within a coverage area in which there is sufficient RF availability for flight traffic. In one or more examples, when a pilot 302 submits a flight plan, the system can query the geofences 306 to make sure there is RF availability throughout the path of the plan and at all altitudes expressed in the flight plan. In one or more examples of the disclosure, geofences can be shared with the pilot/operator of a flight and can be programmed into the autopilot of an aerial vehicle for use during a flight.

In one or more examples, a geofence can be created using a dynamic link budget 308 that is maintained by the digital twin 304. In one or more examples, each geofence 306 can have its own dynamic link budget 308. The dynamic link budget 308 can determine what the RF availability of a given geofence is at any particular moment in time and can even predict RF availability for a given geofence in the future based on various parameters. In one or more examples, the dynamic link budget 308 can include such parameters as directional antenna gain, RF losses, receiver sensitivity, receiver noise factor, power, frequency, spectrum bandwidth, and traffic channel size/quantities (i.e., sub-channels, resource blocks) Quality of service (QoS) requirements, modulation, spectrum monitoring system results (described in further detail below) and the location of any known co-channel or adjacent-channel interferers may impact link budget. The dynamic link budget 308 can also include an RF safety margin to ensure a reliable communications signal in the geofence 306. In one or more examples, the operational spectrum management system 322 (described in detail below) can maintain a real-time version of the link budget that changes based on changing conditions in the RF environment. In one or more examples, the digital twin 304 can maintain a model of the link budget, and that dynamic link budget 308 can be used to predict RF conditions at a future time based on the times implicated by a given flight path. In one or more examples, the dynamic link budgets for each geofence can be validated using measurements of RF spectrum activity at each of the base stations in the area to ensure that the dynamic link budgets include the most up-to-date information and accurately reflect the RF environments that the dynamic link budgets are meant to model. In one or more examples, each geofence can be configured to predict coverage based upon components of the flight plans presented to the spectrum management system, the spectrum monitoring systems employed at each base states, the capabilities of the beam/null forming antennas at each base station and/or satellite, as well as the known locations of other airborne radios. In one or more examples, the actual performance of radio links created at the base stations can be monitored and the information sent to the spectrum management system for validation and modification of the geofences.

In one or more examples, and as part of the process of allocating RF spectrum resources to an aircraft, the digital twin 104 can cross reference the dynamic link budget with a calibrated RF coverage prediction tool 310. In one or more examples, the RF coverage prediction tool 310 uses appropriate RF prediction models, morphology, topology, antenna pattern characteristics, and antenna elevations to create the dynamic geofence coverage area based upon the remote radio configuration and user requirements. In one or more examples, the RF coverage prediction tool 310 may use machine learning and/or predictive analytics to create the dynamic geofence coverage area. In one or more examples, the RF coverage prediction tool 310 can be used to generate a dynamic link budget for each geofence coverage area that a flight will transit based on its filed flight plan. In one or more examples, if it is determined via the dynamic link budget/budgets that a given flight plan may not be able to sustain a reliable communications channel throughout its flight, then the pilot 302 can be notified that their flight plan must be altered in order to give the aircraft 336 and pilot 302 the communications channel needed for the duration the flight. In one or more examples, if it is determined that the flight plan is serviceable, then in one or more examples of the disclosure, the specific RF spectrum channel or channels allocated to the flight from the traffic channel pool can be cross-referenced against a dynamic interference and co-existence prediction tool 312 ("interference tool") to determine if the particular frequency allocated to the flight as described above has the potential to interfere or be interfered with by another flight in the network. In one or more examples, the interference tool 312 can be configured to calculate co-channel or adjacent-channel interference that may occur during a flight. In one or more examples, interference can be caused by other remote radios operating in the network that can be distributed geographically and in altitude across the geographic coverage areas that a given flight will transit based on its flight plan. If it is determined that interference could impact the viability of a given spectrum resource allocation, then in or more examples, the digital twin 304 can select another spectrum resource or resources from the resource pool and analyze the allocated channel using the interference tool 312 to determine if use of the resource will provide a reliable communication link and the resource is available throughout the flight plan as transmitted by the pilot 302. In one or more examples, the spectrum management system can use the interference tool 312 to set one or more exclusion zones (i.e., where aircraft are not allowed to fly). Additionally, the spectrum management system can set one or more exclusion zones based on various regulatory requirements, interference, point-to-point operations, and alternative technology operations including satellite or terrestrial communications networks.

In one or more examples, the spectrum management system may determine the handover points between each geofence coverage area that is involved in the course of a flight. In one or more examples, a handover point can refer to a time or location at which transmission to/from an aircraft is transferred from one base station or satellite to another base station or satellite without the aircraft losing connectivity. The location and elevation of the handover points may be calculated by the RF coverage prediction tool 310 before a flight. In one or more examples, the information related to the predicted handover points may be made known to the pilot before the flight. The pilot may use the information related to the predicted handover points to assist in the process of determining exclusion zones, clearing conflicts in resource allocations, and configuring the equipment and antenna systems in the related geofence coverage areas. In one or more examples, the information related to the predicted handover points may be programmed into the autopilots such that the aircraft and the pilots are made aware of the handover activity before the completion of the flight.

Thus, as described above, the dynamic link budget 308 (in conjunction with the dynamic RF coverage prediction tool 310) can be configured to determine if a given flight plan will have RF coverage at all points and times during the flight plan, while the interference tool 312 can be configured to ensure that the spectrum resource allocated from the resource pool 314 will not be subject to a harmful amount of interference during the flight.

In one or more examples, the spectrum management system may interact with other spectrum management systems to form a network of networks to service a specific flight plan. In one or more examples, the coordination of multiple spectrum management systems may be performed by an airspace integrator. The airspace integrator may allow multiple spectrum management systems to work efficiently together to solve the coverage requirements of a flight plan when coverage with one specific wireless service with a specific spectrum management system is unable to meet the needs of the requested flight plan. In one or more examples, the airspace integrator may include information from global stakeholders (e.g., air traffic regulators, military flight operators, aerospace administrators, etc.), weather services, civil rules related to countries' aviation spaces, and unmanned traffic management systems. The airspace integrator may use the integrated information to allocate physical space for aircrafts, as well as assist the wireless network operators with their spectrum management systems to ensure predictable flight performances based on submitted flight plans. A detailed description of an exemplary airspace integrator is provided below.

As described above, if the network of networks, dynamic link budget 308, or the interference tool 312 determine that a reliable RF link cannot be established during the flight, or that a channel that meets the needs of the flight plan is not available during the proposed time of the flight, then in one or more examples, the digital twin 304 can inform the pilot 302 that the flight plan needs to be adjusted.

Figure 5:
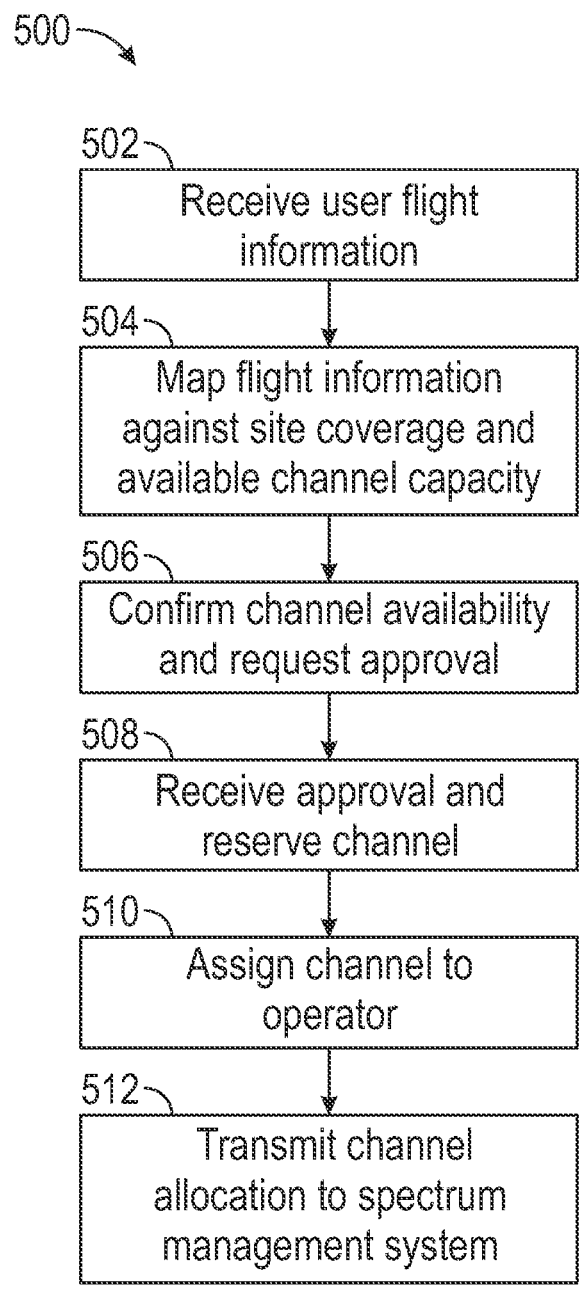
FIG. 5 illustrates an exemplary channel allocation process for RF spectrum management of ground to air communication networks according to examples of the disclosure.

FIG. 5 illustrates an exemplary channel allocation process for RF spectrum management of ground to air communication networks according to examples of the disclosure. The process 500 of FIG. 5 can illustrate the interactions between a pilot 302 and the digital twin 304 to receive an RF spectrum channel allocation as described above. In one or more examples, the process 500 can begin at step 502 wherein the system (via the digital twin 304) can receive flight information from a pilot or user of the system who wants to reserve an RF spectrum channel or channels for a given flight. As described above, and referring to FIG. 3, the flight information received at step 504 can include a flight plan, an aircraft/radio configuration, and a throughput requirement. Thus, at step 502, the digital twin 304 can receive the information from the pilot/operator that is necessary to determine the RF channel needs of a given flight as well as the geographic locations and altitudes that the flight will occupy during its flight.

In one or more examples, once the information is received at step 502, the process 500 can move to step 504 wherein the received flight information can be mapped against site coverage and available channel capacity. In one or more examples, at step 504, the digital twin 304 can use the information received from the pilot 302 to determine if there is RF coverage for the entirety of the proposed flight (as determined by the dynamic link budget 308), the digital twin 304 can also allocate an available channel or channels from the traffic pool 314, and can determine if there will be any potential interference with the channel using the interference tool 312. In one or more examples, determining RF coverage for the entirety of the flight can include making sure that for each RF channel to be utilized by a flight plan, there are available time slots on the channel to facilitate transmissions from the aircraft associated with the flight plan. In one or more examples, determining RF coverage can include taking into account any factor that can have an effect on RF service such as sources of interferences. Thus, in one or more examples, mapping a flight plan against site coverage can not only include determining whether RF traffic resources are available for the flight, but can also include determining whether the quality of RF service during the flight meets an acceptable minimum threshold.

In one or more examples, once the flight plan has been mapped against site coverage and available channel capacity in order to select a channel or channels for use during the flight at step 504, the process 500 can move to step 506 wherein the availability of the channel is confirmed and an approval for the flight plan with channel allocation is requested. In one or more examples, a regulatory body such as the Federal Aviation Administration (FAA) may be required to approve any flight plans. Thus, at step 506, once a channel has been allocated and the availability of the channel has been confirmed, the flight plan can be transmitted to the regulatory body for approval if required.

After mapping the flight plan against site coverage and available channel capacity in step 504, if in step 506 the system cannot confirm channel availability, in one or more examples, the system can reject the received flight plan and alert the user that the flight plan has been rejected. Additionally or alternatively, in one or more examples, in addition to rejecting a flight plan based on lack of channel availability, the system can provide the user with a suggested modified plan that allows the plane to travel from its intended origin to its intended destination (based on the user submitted flight plan) in a manner that will ensure RF channel availability throughout the flight. In one or more examples, modifying the flight plan can include modifying the intended geographic route of the aircraft (e.g., location and altitude information) based on the class of airspace the flight is being conducted in, based on the RF coverage availability of the communications network, or based on traffic channel availability of the communications network. Additionally or alternatively, in place of rerouting the flight, in one or more examples, the system can modify the time window (i.e., the time the flight can take off) in which the flight can be conducted based on traffic channel availability. Alternatively, in one or more examples, depending on the priority of the flight, instead of modifying the flight plan, the system can modify the ability of the communications network to support the flight plan (e.g., by changing or canceling another flight plan in the communications network based on its priority and alerting the user associated with that flight that that their flight plan has been changed or canceled). For instance, if the flight plan is submitted to the system by a user with high priority (for instance for a medical flight) then in one or more examples, the system can modify or cancel the flight plans of other lower priority flights in order to ensure RF channel availability for the priority flight during the flight proposed in the submitted flight plan for the priority flight.

In one or more examples, in addition to or alternatively to modifying the flight plan as described above, the system can present the user who submitted the flight plan with one or more alternative flight plans based on traffic channel availability. The system can provide the user with selectable flight plan options for conducting their desired flight, with each option pertaining to a specific geographic routing and traffic communication resource allocation that can provide the flight with communications coverage at every point in the geographic path indicated by the flight plan. In one or more examples, the multiple flights plans can be presented to the user, in response to a determination that the flight plan submitted by the user cannot be serviced with one or more communications resources at all points during the flight. Additionally or alternatively, the user can provide the system with a starting point for the flight as well as a destination, and the system can present the user with a plurality of selectable flight plans, with each flight plan provided by the system including a communication resource plan for servicing the flight during the route indicated by the flight plan.

In one or more examples, the system can optimize the allocation of resources for multiple concurrent flights. For instance, when allocating communications resources for a particular flight, the system can take into account previous (other aircraft) flight plans as part of the process for allocating communication resources. As an example, the system models the ideal RF link performance of all network aircraft flight plans (e.g., the RF link performance that is achieved when both transmitter and receiver are operating at their expected performance capabilities with no co-channel or adjacent channel interference). As such, the system is aware of the acceptable signal-to-noise (SNR) performance of the RF link to each aircraft as well as calculating the expected SNR when all aircraft are in operation. In one or more examples, when a new aircraft is introduced, it is possible that the new aircraft will cause the expected SNR performance of other aircraft in the network to degrade while still meeting the acceptable SNR for each aircraft. This SNR buffer (i.e. expected—acceptable) enables additional aircraft to be served. This system-wide (global) tradeoff enables optimum and maximized capacity of the entire network. Thus, when determining communication resources to allocate to a specific flight, the system can take into account the impact a particular flight plan will have on other flights of the network, thereby ensuring that the allocation is optimized globally across all flights in the network at a given time and ensuring that all planned flights will have satisfactory link performance across its planned flight. Additionally or alternatively, and in the instance where the SNR degradation for pre-existing flights caused by introduction of a new flight falls below acceptable link performance limits (i.e., below a pre-determined threshold), in order to accommodate new flights, the system can alter the communications resource plan for the previously planned flights to accommodate the new flights. Thus, in one or more examples, in addition to checking how other flights would be affected by inclusion of a particular communication resource allocation plan, the system can change allocation plans for a previously planned flight to accommodate new flights and optimize the channel capacity of the network globally (i.e., across all flights flying in the network at a given time). In one or more examples, a change in allocation to a previous flight can include delaying the start time of a flight, changing the geographic routing of a flight, changing the communication resources allocated to the flight, and any other change to the flight plan that are designed to alleviate spectral impacts caused by the addition of a new flight plan.

In one or more examples, once the request for approval has been transmitted at step 506, the process 500 can move to step 508 wherein the approval from the regulatory body can be received. Additionally, at step 508, once the approval has been received, then the system can reserve the resource or resources that were originally allocated to the flight and approved by the regulatory body. In one or more examples, the reservation of resources may take place before, or in the absence of, requesting approval from a regulatory body. In one or more examples, once resource have been reserved at step 508, the process 500 can move to step 510 wherein the reserved resources are assigned to the pilot and the aircraft for use when the flight plan is to be executed.

Referring back to FIG. 3, and as described above, the digital twin 304 can be responsible for allocating spectrum and planning operations for a flight, before the flight is to take place. However, the actual operations of the communications channel can be handled by a separate spectrum management system 322. In one or more examples, the digital twin 304 and the spectrum management system 304 can be implemented as a single system. Alternatively, the digital twin 304 and the spectrum management system 322 can be implemented as separate systems. In one or more examples of the disclosure, the spectrum management system 322 can be responsible for managing all of the communications links that are operating in a given communications network. Because the spectrum management system 322 is operating in real-time and must make decisions that can affect multiple communications links, in one or more examples, it can be advantageous to implement the digital twin 304 and the spectrum management system 322 on separate systems such that the operations of the digital twin 304 will not impact the speed at which the spectrum management system 322 performs its operations. In one or more examples, and as described below, the spectrum management system 322 can be responsible for implementing and managing the communications links for all flights in a given air-to-ground communications network. Thus, once the spectrum requests are confirmed by the digital twin 304, execution and assignment of the communications channel with the allocated channel or channels can be performed on the spectrum management system 322. Referring back to the example of FIG. 5, once the channel or channels have been assigned to the operator by the digital twin 304 at step 510, the process 500 can move to step 510 wherein the channel allocation and other additional information about the channel can be sent to the spectrum management system 322 for implementation during flight. In one or more examples, the additional information can include other parameters regarding the communications channel to be predicted by the spectrum management system 322 such as the modulation scheme, error correction codes etc. Additionally, or alternatively, the rather than the digital twin 304 transmitting the additional information, the spectrum management system 322 itself can determine the additional information needed to establish a given communications channel during the flight.

As described above, the systems and methods described above can allow for a pilot to submit a flight plan to the spectrum management, which can use the submitted flight plan to generate an RF plan for the flight which ensures that the flight has RF traffic resources made available to it during the duration of its flight. In one or more examples, the generated RF plan can include a plan for what RF traffic resources will be allocated to a flight at any given point during the flight. As described in detail below, the process of generating a RF coverage plan for a flight from a submitted flight plan can utilize the resources of the spectrum management system, the one or more base stations (and their associated hardware assets) of the aviation network, and other resources to generate a complete RF plan that provides RF coverage details for a flight (i.e., how the flight will communicate with the ground base station) during the entire duration of the flight.

Figure 6:
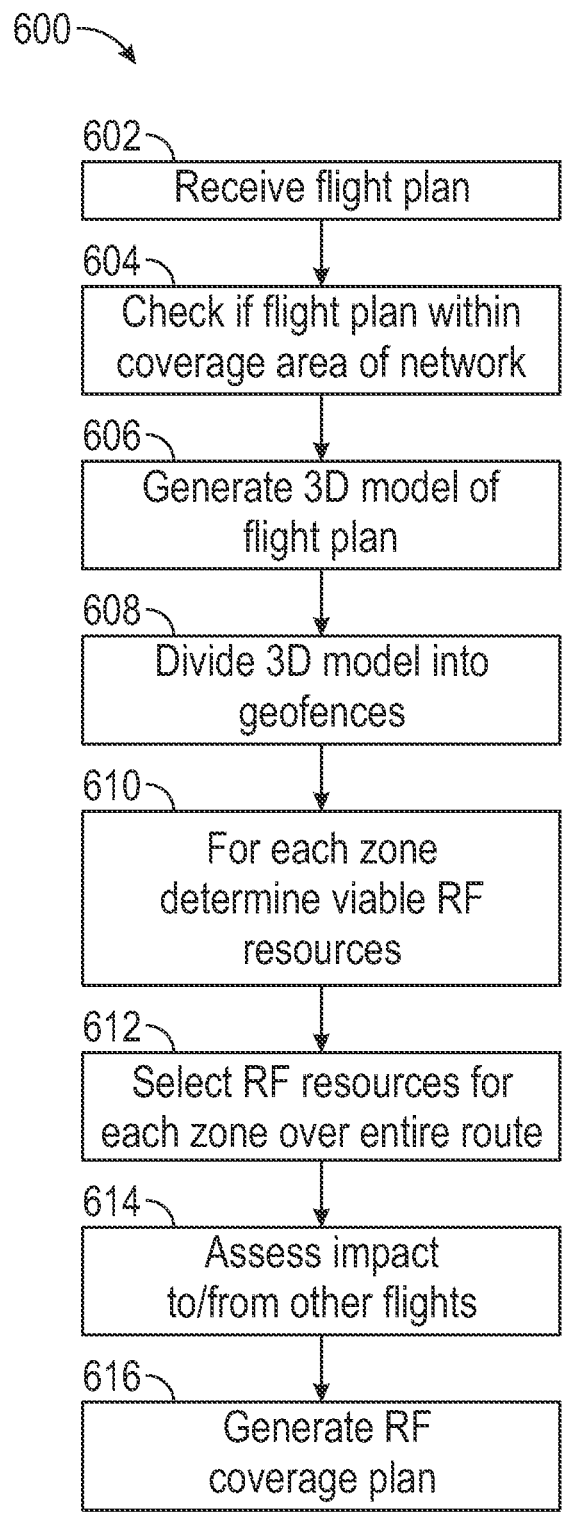
FIG. 6 illustrates an exemplary RF coverage plan generation process according to examples of the disclosure.

FIG. 6 illustrates an exemplary RF coverage plan generation process according to examples of the disclosure. In one or more examples, the process 600 of FIG. 6 can use a flight plan submitted by a user (such as a pilot) and generate an RF coverage plan that details the specific traffic resources that the flight will use to communicate with the ground during execution of the flight plan submitted by the user. In one or more examples, and as described in further detail below, the process 600 of FIG. 6 can use a series of link budgets to determine a plurality of viable RF traffic resources for each coverage area of a plurality of coverage areas covering the flight plan submitted by the user. The series of link budgets can take into account various factors that may influence or impact a given aircraft's ability to utilize a traffic resource including but not limited to the thermal noise, RF interference and RF environment at a given coverage area, the activity of other aircraft that may be transiting the airspace proximally to a given flight, and the impact that a given RF traffic resource assignment provided to a flight may have on other flights within the aviation network. In one or more examples, the process 600 of FIG. 6 can be applied to RF coverage planning of both air-to-ground links and ground-to-air links between a given base station and an aircraft.

In one or more examples, the process 600 of FIG. 6 can begin at step 602 wherein a flight plan provided by a user is received by the system performing the process 600. In one or more examples, and as described above, step 602 can include a pilot 302 (referring to the example of FIG. 3) can submit the flight plan to both a regulatory body (such as the Federal Aviation Administration (FAA)) for approval and additionally send the flight plan to the spectrum management system via the digital twin 304 for the purpose of obtaining one or RF spectrum channels/resources for use during the proposed flight. In one or more examples, the received flight plan can take many forms including but not limited to a complete flight that describes both the geographic flight path of the flight as well as the planned altitude and speed of the flight at any given moment during the flight path.

Figure 7A:
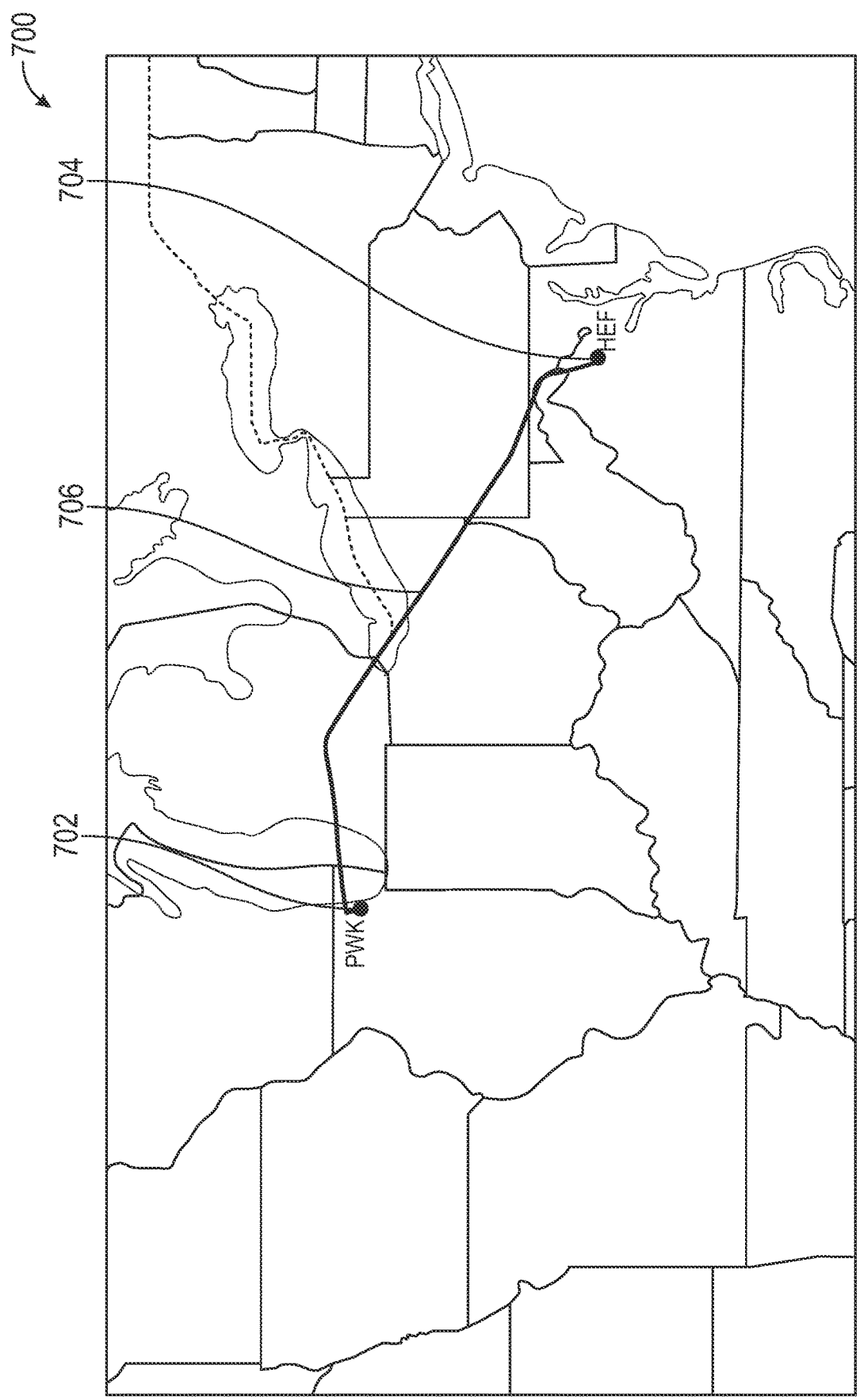

FIGS. 7A-7B illustrate an exemplary flight plan according to examples of the disclosure. In one or more examples, and as illustrated in FIG. 7A, a received flight plan can include a specification of the geographic route a flight intends to traverse during a given flight. For instance, in example 700 of FIG. 7A the flight plan can include a departure point 702 and arrival point 704. In one or more examples, the departure point 702 and the arrival point 704 can refer to the start point and the end point respectively of a given flight. In one or more examples, the flight plan 700 can also include a flight path 706 that specifies the exact geographic route that the aircraft will take to go between the departure point 702 and the arrival point 704. In one or more examples, the departure point 702, arrival point 704, and flight path 706 can be specified in many ways. For instance, in one or more examples, they can be specified using latitude and longitude (i.e., geographic coordinates), or using navigational fixes designated by FAA or other aviation authority, or alternatively they can be specified using a map such as the map illustrated in FIG. 7A. In one or more examples, and as described below, the RF coverage available to an aircraft at any given moment during a flight can be dependent on the position of the flight within a given airspace. For instance, if the flight is transiting an urban area such as a large city, then the RF spectrum in the airspace may be congested with other traffic and thus the number of viable traffic resources may be limited. In contrast, in one or more examples, in a more rural area, the RF spectrum in the airspace may be less congested, and thus an important aspect of generating an RF plan for a given flight is to understand the geographic location of the flight at any given moment during the flight as the geographic location plays an essential role in determining RF coverage for a flight.

In addition to geographic location, the altitude and speed of a flight can also play a significant role in the RF coverage planning for a flight. Thus, in one or more examples, a flight plan received at step 602 can include the planned altitude and speed of the flight at any given moment of the flight. FIG. 7B illustrates an exemplary altitude plan for a flight. In one or more examples, the altitude chart 708 of FIG. 7B can represent altitude vs. time. Thus, in one or more examples, chart 708 illustrates the altitude profile of the flight starting from time 0 (i.e., the departure point of the flight) and terminating when the flight arrives at its arrival point. In one or more examples, the altitude profile can be provided as data showing time and altitude. Likewise, the flight plan received at step 602 can also include information about the planned speed of the aircraft during the flight. In one or more examples, the flight plan can include other information that may be pertinent to determining an RF coverage for the flight plan including the intended departure time of the flight, the intended termination time of the flight, and the duration of the flight. In one or more examples, a flight plan could also include details about the aircraft performing the flight including speed envelope, climb/descend rates, radio configuration, antenna configuration/orientation, radio system performance metrics, or any other information that could influence what RF resources are provided to an aircraft during its flight. In one or more examples, the flight path can also include time and space tolerances, which can account for variations in the precise location and the precise time that an aircraft will transit a particular location. Thus, in one or more examples, rather than representing a flight path as a two-dimensional line, the flight path can be represented using a three-dimensional line (i.e., a cylinder) to account for variations in location and/or time.

Returning to the examples of FIG. 6, once a flight plan has been received at step 602, the process 600 can proceed to step 604, wherein an initial check of the flight plan can be performed to determine if the flight plan is within the coverage area of the network. In one or more examples, the RF coverage plan being generated by a flight will be serviced by one or more spectrum management systems who will utilize a plurality of ground RF communication resources that are communicatively coupled with one another to provide both uplink (i.e., ground-to-air) and downlink (i.e., air-to-ground) communications to and from any aircraft they are servicing. Thus, in one or more examples and at step 604, an initial check of the received flight plan can be performed wherein the geographic route and planned altitude of the flight is checked to ensure that the aviation network has assets that can service the flight at all points during the flight. In one or more examples, if the check performed at step 604 determines that there is not coverage at all points during the flight (i.e., the flight falls out of the coverage area of the network), then in one or more examples the flight plan can be rejected and the user can be notified. Additionally or alternatively, in one or more examples, the process 600 can continue generating the RF coverage plan, but only for the portions of the flight plan that fall within the coverage area of the aviation network. In one or more examples, step 604 of process 600 can be optional, and thus after receiving the flight plan at step 602, the process 600 can immediately proceed to step 606 without performing an initial check to determine if all portions of the submitted flight plan fall with the coverage area of the network. In one or more examples, the process 600 of FIG. 6 can also be applied to air traffic control (ATC) RF resources in addition to the RF spectral resources that service the air-to-base station and base station-to-air communication links.

In one or more examples, once an initial check to determine if the flight plan falls within the coverage area of the aviation network is performed at step 604, and if the at least a portion of the submitted flight plan falls within the coverage area of the aviation network, then in one or more examples, the process 600 can move to step 606 wherein a three-dimensional model of the flight plan can be generated. In one or more examples, the flight plan can specify the intended flight path in three dimensions. For instance the geographic path can represent the first two dimensions, while the altitude specified in the flight plan can represent the third dimension. Thus, in one or more examples, the three-dimensional location of the flight at any time can be determined based on the route and altitude information. In one or more examples, step 606 can include using the information provided in the received flight plan to construct a three-dimensional model of the flight's intended route. In one or more examples, a three-dimensional model can include a listing of the flight's three-dimensional position as a function of time. Thus, in one or more examples, the three-dimensional model can include for instance, latitude, longitude, and altitude of the flight at periodic time intervals (as an example, every second, minute, hour, etc). In one or more examples, each location of the flight may incorporate a horizontal and/or vertical uncertainty, and/or comprise the predicted location of the flight at a range of times. As will be discussed below, an aircraft's three-dimensional position can have a significant impact on the RF resources that are available to it. Thus, in one more examples, the three-dimensional model generated at step 606 can be used to determine an RF coverage plan by providing a model of the flight's route that can be used to select one or more RF traffic resources for the flight.

In one or more examples, and as described in further detail below, the viability of an RF traffic resource can increase or decrease as the flight changes its position. For instance, as a flight progresses, the flight may become closer or move farther away from potentially interfering RF signals, and thus a particular RF traffic resource may become more or less viable depending on the position of the flight at any given time. Thus, in one or more examples, to account for the variation in the RF spectral environment due to the position of the aircraft, once the three-dimensional model is generated at step 606, the process 600 can move to step 608 wherein the three-dimensional model generated at step 606 can be divided into one or more "geofences" for the purpose of discretizing the analysis required to generate an RF flight plan. In one or more examples, a "geofence" can refer to a virtual perimeter model in three-dimensions to represent a real-world geographic area or volume. In one or more examples, a flight plan can be divided into a plurality of geofences at step 606 and an analysis of the RF environment during the flight can be performed on a geofence-by-geofence basis.

In one or more examples, the size of a geofence (i.e., the volume of the geofence) can be chosen so as to balance computational complexity with accuracy. In one or more examples, if the size of a geofence is made too large, then the RF spectral variation (i.e., the strength of various signals and interferers) may have too much variation within the geofence, and thus a large geofence may yield an RF plan that is based on inaccurate information since the viability of an RF traffic resource within a large geofence may vary significantly. In one or more examples, dividing the three-dimensional model into very small (volume wise) or fine geofences may yield a higher fidelity RF coverage plan for the flight because there will be little variation in the RF spectral environment of a particular geofence, however there will be many geofences for a given flight plan (since the three dimensional model is divided into smaller pieces) thereby increasing the computational complexity associated with generating an RF coverage for a given flight plan. Thus, in one or more examples, and at step 608, dividing the three-dimensional models into one or more geofences can include selecting the size of the geofence.

Figure 8A:
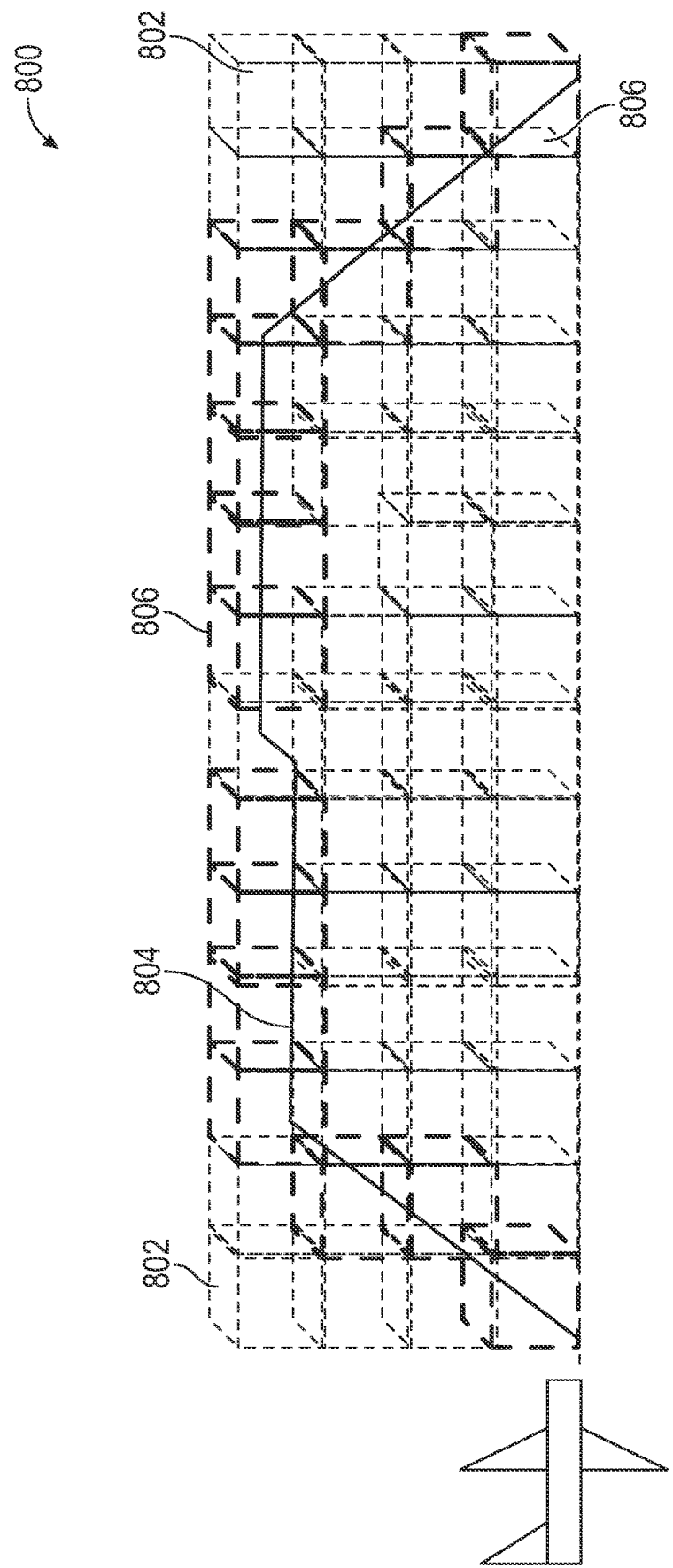
FIGS. 8A-8B illustrate an exemplary divided 3D RF coverage model according to examples of the disclosure.

In one or more examples, dividing a three-dimensional model of a flight plan can include mapping the three-dimensional model to one or more pre-existing geofences. In one or more examples, the coverage area of an aviation network can a priori be divided into a plurality of geofences, and the three-dimensional model generated at step 606 of process 600 can be "mapped" onto the pre-existing geofences. In one or more examples, mapping a three-dimensional model onto one or more pre-existing geofences can include selecting one or more pre-existing geofences associated with the coverage area of the aviation network based on whether the three-dimensional model of the flight plan intersects or crosses through the pre-existing geofence. FIG. 8A illustrates an exemplary mapping of a three-dimensional model to a plurality of pre-existing geofences so as to divide the flight plan into one or more geofences according to examples of the disclosure. In one or more examples, and as illustrated in FIG. 8A, an aviation network coverage area can be divided into a plurality of pre-defined geofences 802. In one or more examples, each geofence 802 can represent a pre-defined three-dimensional volume of airspace of the coverage area 800. In one or more examples, and as illustrated in FIG. 8A, the shape of each geofence can be a three-dimensional cube that is bounded by a range of latitudes, longitudes, and altitudes. However, in one or more examples, the shape of a geofence can be represented by any conventional or non-conventional three-dimensional shape. In one or more examples, the pre-defined geofences can be uniform in shape and size. Alternatively, the pre-defined geofences can have non-uniform sizes in shapes. In one or more examples, a three-dimensional model 804 can be generated based on a flight plan submitted by a pilot. In one or more examples, the three-dimensional model 804 can be mapped onto the plurality of pre-defined geofences 802 and a determination can be made as which pre-defined geofences are intersected by the three-dimensional model 804.

In one or more examples, and as illustrated in FIG. 8A, when the three-dimensional model generated at step 606 of process 600 is mapped onto the plurality of pre-defined geofences of the network coverage area 802, a plurality of implicated geofences 806 can be determined. In one or more examples, an implicated geofence 806 can refer to a geofence of the pre-defined geofences 806 that have a portion of the three-dimensional intersecting it. In one or more examples, every part of a flight plan can intersect with a pre-defined geofence 802 of the plurality of pre-defined geofences. Thus, in one or more examples, implicated geofences 806 can be used to determine an RF coverage plan as those geofences represent the geofences that given flight plan will fly through when implemented. As described in further detail below, only the pre-defined geofences that have been implicated by the three-dimensional model of the flight 804 can be used to determine the RF coverage plan for a given flight.

Figure 8B:
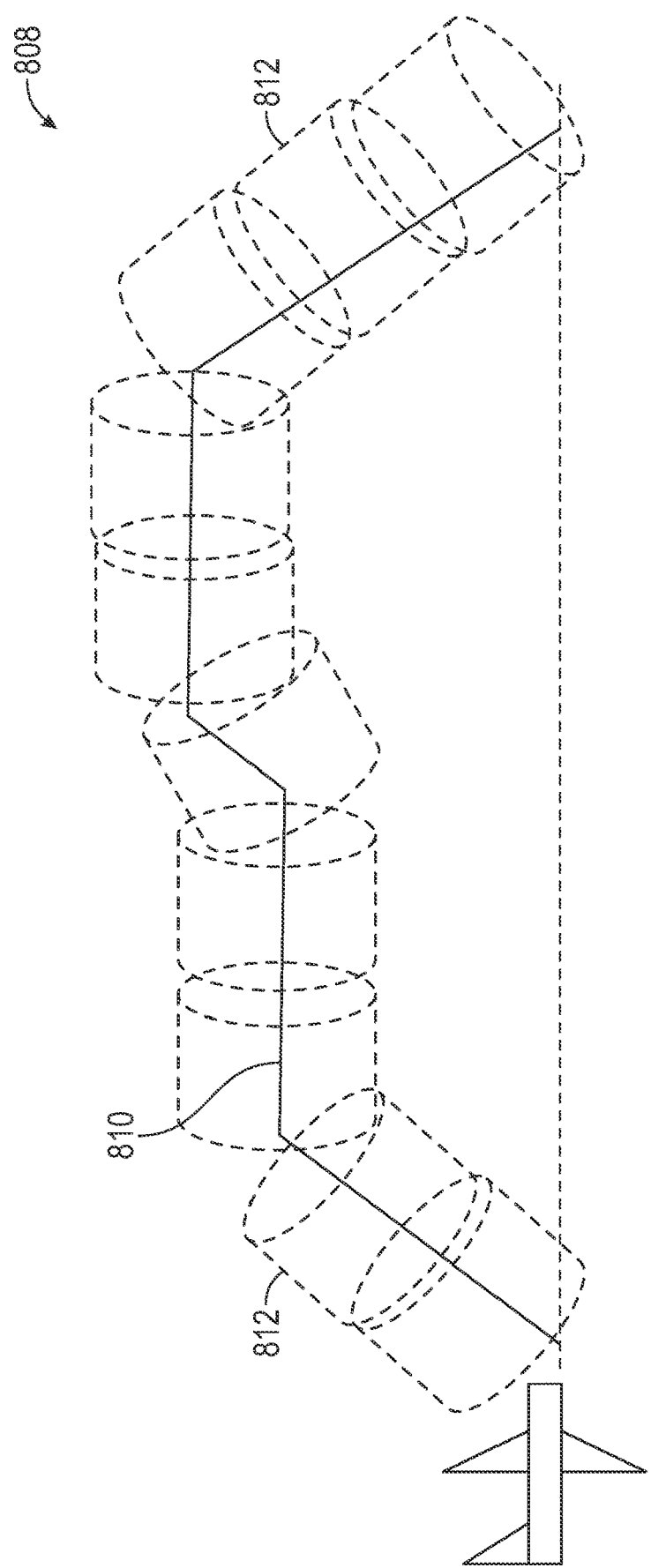

Additionally or alternatively, in one or more examples, rather than mapping a three-dimensional model of a flight plan to a plurality of pre-defined geofences covering the coverage area of the aviation network, the geofences can instead be created around the three-dimensional model. In other words, the geofences can be generated and mapped to the flight plan rather than mapping the three-dimensional model to pre-defined geofences as described above with respect FIG. 8A. FIG. 8B illustrates an exemplary mapping of a plurality of geofences to a three-dimensional model of a flight plan so as to divide the flight plan into one or more geofences according to examples of the disclosure.

In one or more examples, a three-dimensional model of a flight plan (generated at step 606 of FIG. 6) can be mapped into a coverage area 808 of the aviation network. In one or more examples, once the flight plan has been mapped into the coverage area, the three-dimensional model of the flight plan 810 can be divided into one or more segments 812, with each segment representing a separate geofence that will be used to determine an RF coverage plan for the flight. In one or more examples, the one or more geofences 812 can be formed by surrounding or encapsulating a segment or portion of the flight plan with a three-dimensional shape. In one or more examples, every part of the three-dimensional model of the flight plan 810 can be encapsulated by at least one of the geofences 812 that are formed around the three-dimensional model. In one or more examples, the shape of each geofence can be uniform with respect with one another, or in one or more examples, the shape of the geofences can vary depending on the variability of the RF spectral environment of the airspace occupied by a particular flight plan. In one or more examples, while the example of FIG. 8A reduces complexity of computation by avoiding having to create new geofences for each flight plan analyzed, in one or more examples, the example of FIG. 8B can avoid complexity by limiting the number of geofences maintained by the system at any given time to the geofences created specifically for the flight plan.

Returning to the example of FIG. 6, once the three-dimensional model has been divided into one or more geofences at step 608, the process 600 can move to step 610, wherein for each geofence identified or created at step 608, a list of viable RF resources is determined. In one or more examples, and as discussed in further detail below, a "viable" RF resource can refer to a RF channel or other RF traffic resource according to the examples described above that can be used to facilitate communications between a ground-based communications station and an aircraft during its flight. In one or more examples, determining the viability of a RF resource at a particular geofence can include taking into account the projected spectral/RF environment of a geofence at the time proposed in a flight plan. In one or more examples, the projected spectral/RF environment can be projected using multiple data sources. For instance, and as described in further detail below, the spectral/RF environment can be projected using data acquired from various ground-based station assets described above with respect to FIG. 3 including spectrum monitoring device 328 and base station link monitoring 332. Additionally or alternatively, the information used to provide projections of the spectral/RF environment can be provided by external sources such as meteorological data, data about other RF transmitters/receivers in the area, historical flight data, historical RF environment data, etc., that can be used to project the RF/spectral environment of a geofence at the time that a flight is projected to be within the geofence.

Figure 9:
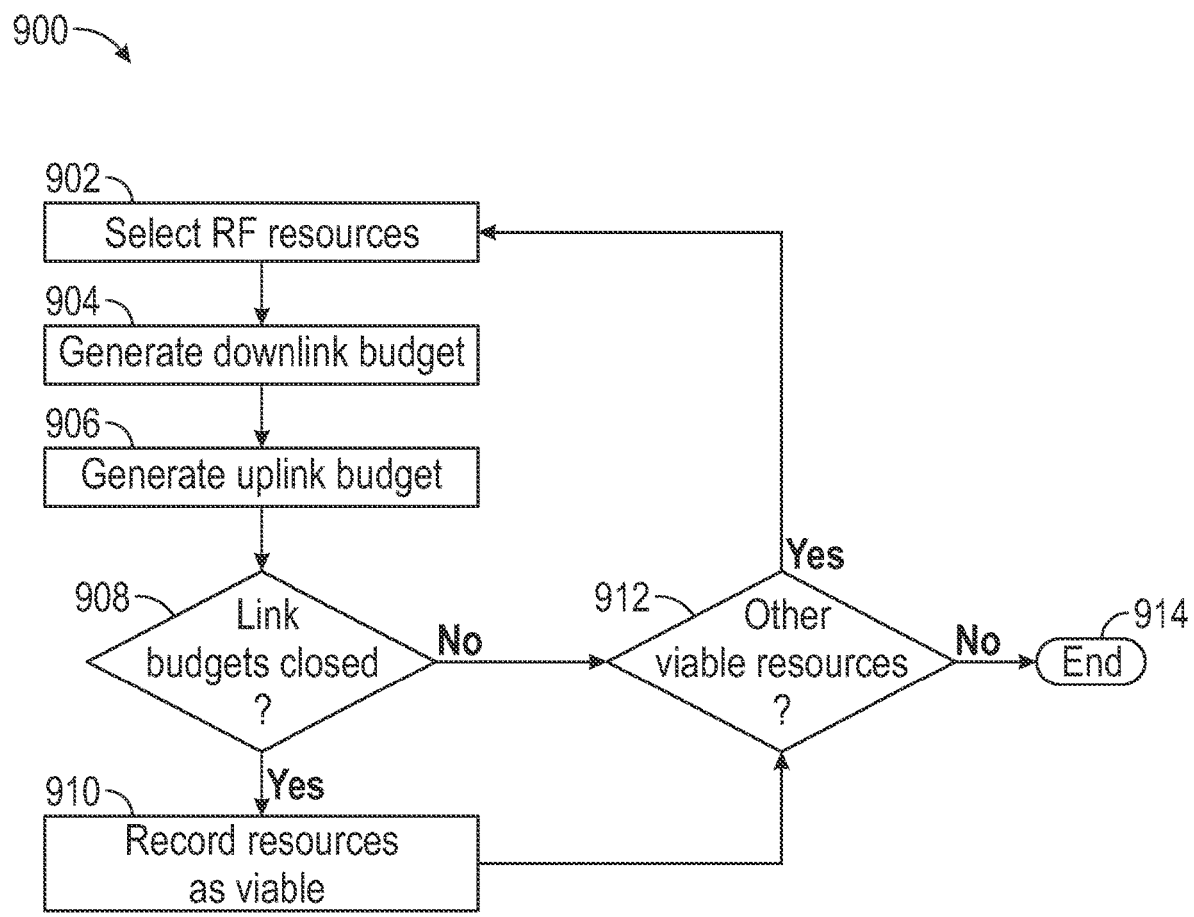
FIG. 9 illustrates an exemplary traffic resource optimization process according to examples of the disclosure.

FIG. 9 illustrates an exemplary process for determining viable RF traffic resources for a geofence according to examples of the disclosure. The process 900 of FIG. 9 is meant to be exemplary and should not be seen as limiting to the disclosure. In one or more examples, the sequential method for determining viable RF traffic resources for a geofence presented with respect to FIG. 9 is an exemplary method for determining viable RF resources, and the same result could be achieved with other methods such as employing machine learning algorithms, or employing full optimization solutions using a cost function that can include "binary values" as well as discrete or continuous values. In one or more examples, the process 900 of FIG. 9 can be utilized to determine one or more viable RF resources for both uplink traffic and downlink traffic between a UAV and a ground base stations for a given geofences. As described above, a geofence can refer to a virtual perimeter model in three-dimensions so as to represent a real-world geographic area or volume. Thus, in one more examples, the process 900 of FIG. 9 can be utilized to determine what RF resources are viable to facilitate communications between a UAV and a ground-based base station within a given geofence. In one or more examples, and as described in detail below, the process 900 can use data relevant to the projected RF/spectral environment of the geofence at the proposed time that a particular flight will be in the geofence to determine which RF traffic resources would be viable to use to facilitate an RF communications link between the aircraft of the flight plan and a ground base station communicating with the flight. In one or more examples the process 900 can be performed at a plurality of points within a geofence constituting a representative sample, and the results aggregated so as to represent the viability, or upper/lower bounds on viability, of RF resources.

In one or more examples, the process 900 can begin at step 902 wherein one or more available RF resources can be selected. In one or more examples, a given geofence can be determined to be within the coverage area of a particular base station of an aviation network. Thus, in one or more examples, selecting the one or more RF resources can include determining which RF traffic resources are not only available for use within a given geofence, but also whether an available RF traffic resource will be able to facilitate communications between the aircraft and the base station associated with the geofence at the proposed time of the flight. With respect to step 902, in one or more examples, selecting one or more RF resources can include selecting one or more RF resources that are available from a traffic resource pool like the resources described above with respect to FIGS. 4A-4B. A particular traffic resource may be considered "free" or "available" if it has not been a priori reserved by a previously planned flight or reserved for other purposes at the particular base station and at the proposed time of the flight. In one or more examples, selecting one or more available traffic resources at step 902 can include selecting both an uplink traffic resource and/or a downlink traffic resource. In one or more examples an uplink traffic resource can refer to a traffic resource to facilitate communications from the ground station to the aircraft, whereas a downlink traffic resource can refer to a traffic resource to facilitate communications from the aircraft to the ground station.

Once one or more available traffic resources have been identified at step 902, the process 900 can move to step 904 wherein a downlink budget can be generated based on the one or more selected traffic resources and information about the spectral/RF environment of the geofence at the proposed time of the flight based on the flight-plan submitted by the user. In one or more examples, a simple link budget equation can be expressed as follows:

Received power (dBm)=transmitted power (dBm)+ gains (dB)−losses (dB)

With respect to a downlink budget, the received power can represent the power of the signal received at the receiver of the ground-based station from a signal transmitted from a transmitter from the UAV flying the flight plan. In one or more examples, in order for a RF traffic resources to be considered viable, the received power may be compared against a pre-determined threshold to determine if it is strong enough to provide the ground base station with a usable signal that has sufficient power to be received and decoded. In one or more examples, the transmitted power in the equation above can represent that power of the signal transmitted by the transmitter of the UAV, the gains term can represent any amplification that the signal may receive during transmission from the UAV, and the losses can represent any power losses that may be experienced by the transmitted signal as it propagates to the receiver antenna of the base station, or internal power losses within the base station (e.g., from cables connecting the antenna). The equation provided above is meant to be exemplary in nature and may not represent all of the factors taken into account with respect to calculating a link budget for the downlink communications channel.

In one or more examples, the transmitted power of the link budget can represent the effective radiated power (ERP) of the transmitting antenna. In one or more examples, information about the ERP of the transmitting antenna can be derived from flight plan information which can, in one or more examples, include information about the transmitter stationed on the aircraft. For instance, with knowledge of the model type and specifications of the transmitter provided in the flight plan, in one or more examples, the ERP of the transmitter at a given frequency can be estimated at step 904. In one or more examples, and with respect to losses calculated for the signal as it propagates to the receiving antenna, the losses can include propagation loss associated the signal traveling through the air to the receiver. Thus, in one or more examples, the propagation loss can be calculated based on the location of the ground-based station with respect to the position of the aircraft within the geofence, the orientation of the ground station antenna with respect to the aircraft, the orientation of the aircraft transmitter with respect to the ground station antenna, cable and connector losses, antenna gain and efficiency, receiver sensitivity, obstruction loss, multipath loss, and any other factor that may have the potential to degrade the power of the transmitted signal before it reaches the receive antenna of the station.

In one or more examples, in addition to calculating propagation losses, the process at step 904 can also take into account the effect on received signal (at the ground station) caused by interference signals at the time of the flight. For instance, in one or more examples, if an aircraft operation at another base station may be using the same or similar RF traffic resource, but its geometry with respect to the flight being planned is such that the other flight may cause interference with the flight being planned, then the interference can be accounted when calculating the downlink budget at step 904. In one or more examples, the uplink budget can be calculated based on the RF resource selected at step 902 for the downlink communications channel. In one or more examples, once the downlink budget has been calculated at step 904, in one or more examples, the process 900 can move to step 906 wherein an uplink budget calculated. In one or more examples, calculating the uplink budget can include using the equation above to determine whether the power of a signal transmitted from the base station will yield a signal of sufficient strength to be received at the receiver of an aircraft in the geofence. In one or more examples, the uplink budget can be based on the same types of losses and interferers discussed above with respect to the downlink budget. In one or more examples, the uplink budget can be calculated based on the RF resource selected at step 902 for the uplink communications channel. In one or more examples, the relative resource allocations of a signal and an interferer, whether by a frequency offset, a time-slot offset, or other means, may wholly or partially mitigate the effect of the interfering signal.

In one or more examples, once the downlink and uplink budgets have been calculated at step 904 and 906 (which can be performed in any order or even in parallel), the process 900 can move to step 908 wherein a determination is made as to whether both link budgets have "closed." In one or more examples, a link budget can be determined to be closed if the received power and/or the received signal-to-noise (SNR) is above a pre-determined threshold. In one or more examples, the pre-determined threshold can be empirically determined so as to guarantee a quality of service that is acceptable for operation of a flight. In one or more examples, quality of service (QoS) can refer a measurement or description of the overall performance of a service, which in the case of the RF coverage plan, can refer to the performance of the communication link between the aircraft and a ground base station.

In one or more examples, if the link budgets are determined to be closed at step 908, then in one or more examples, the process 900 can move to step 910 wherein the one or more RF resources selected at step 902 can be recorded (in a memory) as being viable. Once recorded at step 910, the process 900 can then move to step 912, wherein a determination is made as to whether there are any more RF traffic resources within the traffic pool that have not yet been considered for viability. If it is determined at step 912 that there are more resources to be considered, then in one or more examples, the process 900 can revert back to step 902 wherein the viability of other resources not previously considered can be determined. In one or more examples, if the link budgets are determined to not close, then traffic resources that were selected at step 908 can be deemed not to be viable, and the process 900 can move directly to step 912 to consider the viability of other available traffic resources. In one or more examples, once it is determined at step 912 that there are no other available resources to consider, then one on or more examples the process can move to step 914 wherein the process 900 is terminated. The conclusion of process 900 can thus yield a list of viable RF traffic resources for a given geofence that, as described in further detail below, can be used to generate an RF coverage plan for the flight. In one or more examples, if the process 900 terminates without any viable RF traffic resources being available, then in one or more examples, the flight plan submitted by the user can be rejected due to a lack of available RF resources. Additionally or alternatively, the list of available RF resources for a given geofence can be used to concatenate or split geofences. In one or more examples, if two geofences (which are adjacent to one another geographical) include substantially similar viable RF resources, then in one or more examples, the two geofences can be concatenated (i.e., combined to form a larger geofence.) In one or more examples, if a particular geofence is found to have no viable resources or a low amount of viable RF resources, then in one or more examples, the geofence can be split into two or more geofences, and each individual geofence can be reassessed for viable RF resources. In this way, the lack of coverage can be limited to the smallest geographic area possible, by ensuring that non-viable coverage areas are made as small as possible.

Returning to the examples of FIG. 6, in one or more examples, the process 900 of FIG. 9 can be applied on each and every geofence created or determined at step 608. Thus, in one or more examples, step 610 (which in one or more examples can be implemented using the process 900 of FIG. 9) can yield a list of viable RF traffic resources for each and every geofence. In one or more examples, once the viable resources for each geofence have been determined at step 610, the process 600 can move to step 612, wherein a selection for each geofence can be made from the list of viable RF traffic resources determined for each geofence. In one or more examples, selection of a viable frequency for each geofence at step 612 can include selecting the resources so as to optimize the entirety of the flight plan. In other words, the selection of the traffic resource can take into account not only the geofence being considered, but the other geofences that make up the flight plan as well. In one or more examples, the selection of RF traffic resources can involve an optimization problem in which the selection of resources is based on maximizing or minimizing certain conditions associated with the selection of the resources. For instance, in one or more examples, the number of times that an aircraft changes its RF traffic resource (i.e., the frequency it uses to communicate with the ground) can be minimized, and thus in one or more examples, choosing an RF traffic resource for each geofence can take into account the desire to minimize changes in the RF traffic resource used from geofence to geofence. In one or more examples, the optimization can include accounting for other factors including using preferred resources, yield the maximum SNR over the course of the flight, achieving spectral separation from other aircraft operating in the airspace, etc. In one or more examples, the selection of RF resources for each geofence can take into account multiple factors, with each factor being considered being weighted according to the preference of the system. For instance, minimizing frequency changes at handover points during the flight might be more important than maximizing SNR, and thus in one or more examples, when selecting the RF traffic resource for each geofence, minimizing frequency changes can be weighted higher in an optimization process than SNR.

In one or more examples, step 612 of process 600 can yield a RF traffic resource selection for each and every geofence, and thus an RF plan for each and every portion of the flight. In one or more examples, once a preliminary RF coverage plan is created at the conclusion of step 612, in one or more examples, the process 600 can move to step 614, wherein the preliminary flight is assessed to determine its impact to other RF coverage plans for other flights previously generated. In one or more examples, and as described above, the RF activity of a flight can adversely impact the RF communications of other flights that are in geographic or spectral proximity to the flight. For instance, in one or more examples, even though two aircraft may be in contact with the ground using two different ground base stations, in one or more examples, their communications may adversely impact each other based on their position with respect to one another. This can be especially true if they are utilizing the same RF traffic resource (albeit with respect to different ground stations) or RF traffic resources that are spectrally similar. Thus, in one or more examples, at step 614 a check is made to ensure that the preliminary RF coverage plan generated at step 612 does not adversely impact other flight plans in the system. In one or more examples, determining whether the preliminary flight plan adversely impacts other flights can include determining one or more flights that may be impacted by the preliminary RF coverage plan (i.e., flights within a certain distance from the flight path of the flight under consideration) and then determining whether the preliminary RF coverage plan will cause the link budgets of proximal flight to no longer close. In one or more examples, if a flight plan is found to adversely impacted at step 614, then in one or more examples, the process can either repeat steps 610 or 612 to re-plan the coverage plan, reject the RF coverage plan and alert the user, and/or modify the flight plan and/or coverage plan of the proximal flights to avoid the interference.

In one or more examples, once the impact to the other flight plans is assessed at step 614, in one or more examples, the process 600 can move to step 616 wherein the RF coverage plan is finalized and generated. In one or more examples, finalizing/generating the RF coverage plan can include transmitting the RF coverage plan to the user. Additionally or alternatively, finalizing the RF coverage plan can include reserving the traffic resources associated with the RF coverage plan, and storing the plan in the system for use when the flight becomes operational (i.e., the flight plan commences). In one or more examples, if the process 600 does not yield a complete RF coverage plan (for instance because one or more sectors of a flight plan do not have coverage), then in one or more examples the system can instead provide the user with an indication that one or more segments of their flight plan may not have RF coverage, and additionally or alternatively can suggest an alternate flight plan that would have coverage throughout the flight.

Figure 10:
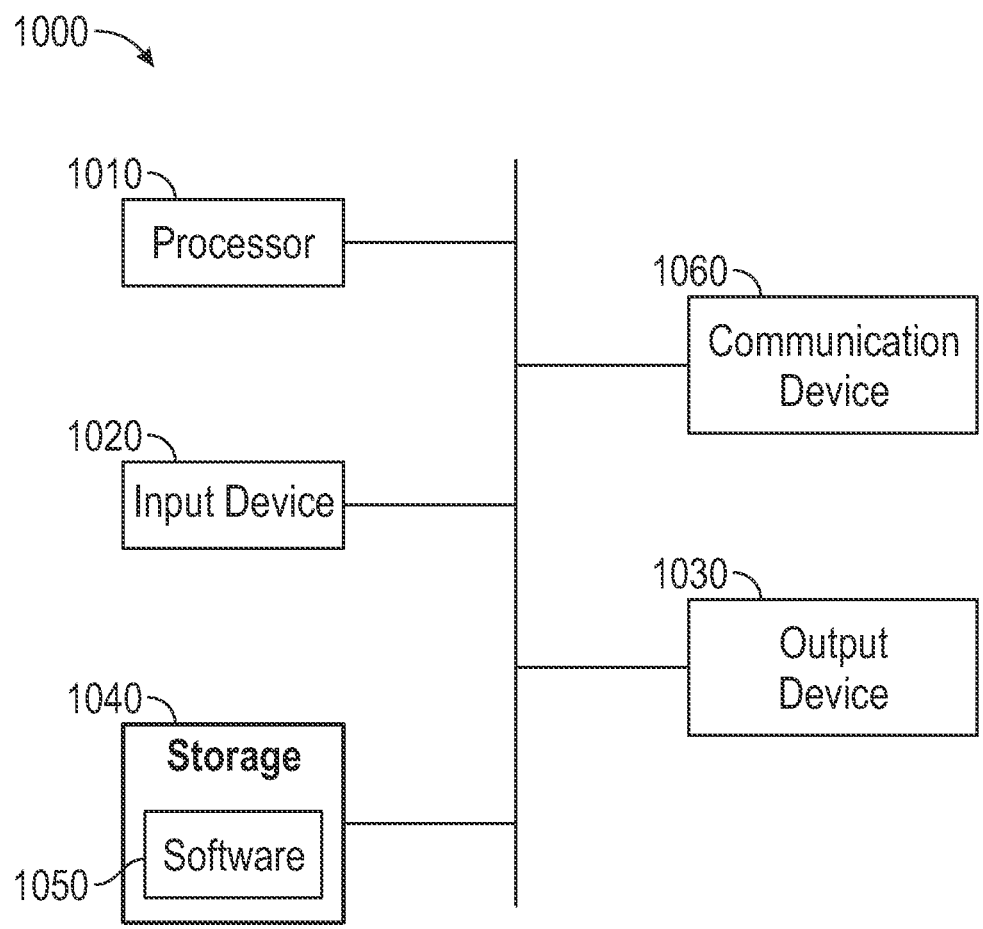
FIG. 10 illustrates an exemplary computing system, according to examples of the disclosure.

FIG. 10 illustrates an example of a computing system 1000, in accordance with some examples System 1000 can be a client or a server. As shown in FIG. 10, system 1000 can be any suitable type of processor-based system, such as a personal computer, workstation, server, handheld computing device (portable electronic device) such as a phone or tablet, or dedicated device. The system 1000 can include, for example, one or more of input device 1020, output device 1030, one or more processors 1010, storage 1040, and communication device 1060. Input device 1020 and output device 1030 can generally correspond to those described above and can either be connectable or integrated with the computer.

Input device 1020 can be any suitable device that provides input, such as a touch screen, keyboard or keypad, mouse, gesture recognition component of a virtual/augmented reality system, or voice-recognition device. Output device 1030 can be or include any suitable device that provides output, such as a display, touch screen, haptics device, virtual/augmented reality display, or speaker.

Storage 1040 can be any suitable device that provides storage, such as an electrical, magnetic, or optical memory including a RAM, cache, hard drive, removable storage disk, or other non-transitory computer readable medium. Communication device 1060 can include any suitable device capable of transmitting and receiving signals over a network, such as a network interface chip or device. The components of the computing system 1000 can be connected in any suitable manner, such as via a physical bus or wirelessly.

Processor(s) 1010 can be any suitable processor or combination of processors, including any of, or any combination of, a central processing unit (CPU), field programmable gate array (FPGA), and application-specific integrated circuit (ASIC). Software 1050, which can be stored in storage 1040 and executed by one or more processors 1010, can include, for example, the programming that embodies the functionality or portions of the functionality of the present disclosure (e.g., as embodied in the devices as described above)

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 1000 can implement any operating system suitable for operating on the network. Software 1050 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated. For the purpose of clarity and a concise description, features are described herein as part of the same or separate examples; however, it will be appreciated that the scope of the disclosure includes examples having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for allocating radio frequency (RF) spectrum traffic resources in an air-to-ground communications network, the method comprising:
    receiving a flight plan, wherein the flight plan comprises timing, location, and altitude information for an aircraft that is to fly in one or more coverage areas of the air-to-ground communications network;
    generating a three-dimensional model of the received flight plan, wherein the three-dimensional model includes geographic location information and altitude information for the flight;
    dividing the generated three-dimensional model into one or more portions;
    associating one or more geofences with each of the one or more portions of the three-dimensional model, wherein each geofence of the one or more geofences represents a geographic range and an altitude range, and wherein the portion of the generated three-dimensional model associated with a geofence includes geographic location information and altitude information that falls within the geographic range and altitude range of its associated geofence;
    for each geofence associated with a portion of the generated three-dimensional model, determining one or more viable RF traffic resources to be used by the aircraft to communicate with one or more base stations of the communications network when the aircraft is flying through the geographic range and altitude range represented by the geofence; and
    generating an RF coverage plan for the aircraft based on the determined one or more viable RF traffic resources for each geofence associated with a portion of the generated three-dimensional model, wherein an RF coverage plan comprises an assignment of at least one RF traffic resource to be used by the aircraft and the one or more base stations of the communications network during execution of the received flight plan.

2. The method of claim 1, wherein associating one or more geofences with each of the one or more portions of the three-dimensional model comprises:
    dividing the one or more coverage areas of the air-to-ground communications network into a plurality of geofences, with each geofence associated with a geographic range and altitude range of the one or more coverage areas; and
    associating each portion of the three-dimensional model with one or more of the plurality of geofences based on whether a geographic range and an altitude range associated with the portion of the three-dimensional model falls within the geographic range and altitude range of the one or more geofences.

3. The method of claim 1, wherein associating one or more geofences with each of the one or more portions of the three-dimensional model comprises:
    for each portion of the one or more portions of the generated three-dimensional model:
        generating a geofence, wherein the generated geofence comprises a geographic range and altitude range that encompasses a geographic range and altitude range of the portion of the three-dimensional model.

4. The method of claim 1, wherein determining one or more viable RF traffic resources to be used by the aircraft to communicate with one or more base stations of the communications network when the aircraft is flying through the geographic range and altitude range represented by the geofence comprises:
    selecting an RF traffic resource from a plurality of RF traffic resources;
    generating one or more link budgets based on the selected RF traffic resource and the geographic and altitude ranges associated with the geofence; and
    determining whether the selected RF traffic resource is viable based on the generated one or more link budgets.

5. The method of claim 4, wherein generating one or more link budgets based on the selected RF traffic resource and the geographic and altitude ranges associated with the geofence comprises generating a link budget for communications transmitted from a base station of the communication network to the aircraft.

6. The method of claim 5, wherein generating one or more link budgets based on the selected RF traffic resource and the geographic and altitude ranges associated with the geofence comprises generating a link budget for communications transmitted from the aircraft to the base station of the communication network.

7. The method of claim 4, wherein the one or more link budgets is configured to determine whether a signal transmitted by a transmitter will reach a receiver with a power level that is above a pre-determined threshold.

8. The method of claim 7, wherein the one or more link budgets is configured to determine whether a signal transmitted by a transmitter will reach a receiver with a signal-to-noise ratio that is above a pre-determined threshold.

9. The method of claim 1, wherein generating an RF coverage plan for the aircraft based on the determined one or more viable RF traffic resources for each geofence associated with a portion of the generated three-dimensional model comprises: for each geofence associated with a portion of the generated three-dimensional model, selecting a viable RF traffic resource of the determined one or more viable resources.

10. The method of claim 9, wherein selecting a viable RF traffic resource of the determined one or more viable resources is based on minimizing a number of times that the aircraft will switch traffic resources used during execution of the flight plan.

11. The method of claim 1, wherein selecting a viable RF traffic resource of the determined one or more viable resources is based on maintaining a signal-to-noise ratio associated with a communications channel between the base station and the aircraft above a pre-determined threshold.

12. The method of claim 1, wherein selecting a viable RF traffic resource of the determined one or more viable resources is based on maximizing the total number of aircraft using the communication system.

13. The method of claim 1, wherein selecting a viable RF traffic resource of the determined one or more viable resources is based on RF link performance associated with another flight plan different from the received flight plan.

14. The method of claim 1, wherein the method comprises notifying a user who submitted the flight plan if it is determined that there are no viable RF traffic resources for a given geofence of the one or more geofences.

15. The method of claim 14, wherein the method comprises generating a modification to the received flight plan if it is determined that there are no viable RF traffic resources for a given geofence of the one or more geofences.

16. A system for allocating radio frequency (RF) spectrum traffic resources in an air-to-ground communications network, the system comprising:
a memory;
one or more processors;
wherein the memory stores one or more programs that when executed by the one or more processors, cause the one or more processors to:
receive a flight plan, wherein the flight plan comprises timing, location, and altitude information for an aircraft that is to fly in one or more coverage areas of the air-to-ground communications network;
generate a three-dimensional model of the received flight plan, wherein the three-dimensional model includes geographic location information and altitude information for the flight;
divide the generated three-dimensional model into one or more portions;
associate one or more geofences with each of the one or more portions of the three-dimensional model, wherein each geofence of the one or more geofences represents a geographic range and an altitude range, and wherein the portion of the generated three-dimensional model associated with a geofence includes geographic location information and altitude information that falls with the geographic range and altitude range of its associated geofence;
for each geofence associated with a portion of the generated three-dimensional model, determine one or more viable RF traffic resources to be used by the aircraft to communicate with one or more base stations of the communications network when the aircraft is flying through the geographic range and altitude range represented by the geofence; and
generate an RF coverage plan for the aircraft based on the determined one or more viable RF traffic resources for each geofence associated with a portion of the generated three-dimensional model, wherein an RF coverage plan comprises an assignment of at least one RF traffic resource to be used by the aircraft and the one or more base stations of the communications network during execution of the received flight plan.

17. The system of claim 16, wherein associating one or more geofences with each of the one or more portions of the three-dimensional model comprises:
dividing the one or more coverage areas of the air-to-ground communications network into a plurality of geofences, with each geofence associated with a geographic range and altitude range of the one or more coverage areas; and
associating each portion of the three-dimensional model with one or more of the plurality of geofences based on whether a geographic range and an altitude range associated with the portion of the three-dimensional model falls within the geographic range and altitude range of the one or more geofences.

18. The system of claim 16, wherein associating one or more geofences with each of the one or more portions of the three-dimensional model comprises:
for each portion of the one or more portions of the generated three-dimensional model:
generating a geofence, wherein the generated geofence comprises a geographic range and altitude range that encompasses a geographic range and altitude range of the portion of the three-dimensional model.

19. The system of claim 16, wherein determining one or more viable RF traffic resources to be used by the aircraft to communicate with one or more base stations of the communications network when the aircraft is flying through the geographic range and altitude range represented by the geofence comprises:
selecting an RF traffic resource from a plurality of RF traffic resources;
generating one or more link budgets based on the selected RF traffic resource and the geographic and altitude ranges associated with the geofence; and
determining whether the selected RF traffic resource is viable based on the generated one or more link budgets.

20. The system of claim 19, wherein generating one or more link budgets based on the selected RF traffic resource and the geographic and altitude ranges associated with the geofence comprises generating a link budget for communications transmitted from a base station of the communication network to the aircraft.

21. The system of claim 20, wherein generating one or more link budgets based on the selected RF traffic resource and the geographic and altitude ranges associated with the geofence comprises generating a link budget for communications transmitted from the aircraft to the base station of the communication network.

22. The system of claim 19, wherein the one or more link budgets is configured to determine whether a signal transmitted by a transmitter will reach a receiver with a power level that is above a pre-determined threshold.

23. The system of claim 22, wherein the one or more link budgets is configured to determine whether a signal transmitted by a transmitter will reach a receiver with a signal-to-noise ratio that is above a pre-determined threshold.

24. The system of claim 16, wherein generating an RF coverage plan for the aircraft based on the determined one or more viable RF traffic resources for each geofence associated with a portion of the generated three-dimensional model comprises: for each geofence associated with a portion of the generated three-dimensional model, selecting a viable RF traffic resource of the determined one or more viable resources.

25. The system of claim 24, wherein selecting a viable RF traffic resource of the determined one or more viable resources is based on minimizing a number of times that the aircraft will switch traffic resources used during execution of the flight plan.

26. The system of claim 25, wherein selecting a viable RF traffic resource of the determined one or more viable resources is based on maximizing a signal to noise ratio associated with a communications channel between the base station and the aircraft.

27. The system of claim 16, wherein selecting a viable RF traffic resource of the determined one or more viable resources is based on maximizing the total number of aircraft using the communication system.

28. The system of claim 16, wherein selecting a viable RF traffic resource of the determined one or more viable resources is based on a RF link performance associated with another flight plan different from the received flight plan.

29. The system of claim 16, wherein the one of more processors are caused to notify a user who submitted the flight plan if it is determined that there are no viable RF traffic resources for a given geofence of the one or more geofences.

30. The system of claim 29, wherein the one or more processors are caused to generate a modification to the received plan if it is determined that there are no viable RF traffic resources for a given geofence of the one or more geofences.

31. A non-transitory computer readable storage medium storing one or more programs for allocating RF spectrum channels in an air-to-ground communications network, for execution by one or more processors of an electronic device that when executed by the device, cause the device to:
    receive a flight plan, wherein the flight plan comprises timing, location, and altitude information for an aircraft that is to fly in one or more coverage areas of the air-to-ground communications network;
    generate a three-dimensional model of the received flight plan, wherein the three-dimensional model includes geographic location information and altitude information for the flight;
    divide the generated three-dimensional model into one or more portions;
    associate one or more geofences with each of the one or more portions of the three-dimensional model, wherein each geofence of the one or more geofences represents a geographic range and an altitude range, and wherein the portion of the generated three-dimensional model associated with a geofence includes geographic location information and altitude information that falls with the geographic range and altitude range of its associated geofence;
    for each geofence associated with a portion of the generated three-dimensional model, determine one or more viable RF traffic resources to be used by the aircraft to communicate with one or more base stations of the communications network when the aircraft is flying through the geographic range and altitude range represented by the geofence; and
    generate an RF coverage plan for the aircraft based on the determined one or more viable RF traffic resources for each geofence associated with a portion of the generated three-dimensional model, wherein an RF coverage plan comprises an assignment of at least one RF traffic resource to be used by the aircraft and the one or more base stations of the communications network during execution of the received flight plan.

32. The non-transitory computer readable storage medium of claim 31, wherein associating one or more geofences with each of the one or more portions of the three-dimensional model comprises:
    dividing the one or more coverage areas of the air-to-ground communications network into a plurality of geofences, with each geofence associated with a geographic range and altitude range of the one or more coverage areas; and
    associating each portion of the three-dimensional model with one or more of the plurality of geofences based on whether a geographic range and an altitude range associated with the portion of the three-dimensional model falls within the geographic range and altitude range of the one or more geofences.

33. The non-transitory computer readable storage medium of claim 31, wherein associating one or more geofences with each of the one or more portions of the three-dimensional model comprises:
    for each portion of the one or more portions of the generated three-dimensional model:
        generating a geofence, wherein the generated geofence comprises a geographic range and altitude range that encompasses a geographic range and altitude range of the portion of the three-dimensional model.

34. The non-transitory computer readable storage medium of claim 31, wherein determining one or more viable RF traffic resources to be used by the aircraft to communicate with one or more base stations of the communications network when the aircraft is flying through the geographic range and altitude range represented by the geofence comprises:
    selecting an RF traffic resource from a plurality of RF traffic resources;
    generating one or more link budgets based on the selected RF traffic resource and the geographic and altitude ranges associated with the geofence; and
    determining whether the selected RF traffic resource is viable based on the generated one or more link budgets.

35. The non-transitory computer readable storage medium of claim 34, wherein generating one or more link budgets based on the selected RF traffic resource and the geographic and altitude ranges associated with the geofence comprises generating a link budget for communications transmitted from a base station of the communication network to the aircraft.

36. The non-transitory computer readable storage medium of claim 35, wherein generating one or more link budgets based on the selected RF traffic resource and the geographic and altitude ranges associated with the geofence comprises generating a link budget for communications transmitted from the aircraft to the base station of the communication network.

37. The non-transitory computer readable storage medium of claim 34, wherein the one or more link budgets is configured to determine whether a signal transmitted by a transmitter will reach a receiver with a power level that is above a pre-determined threshold.

38. The non-transitory computer readable storage medium of claim 34, wherein the one or more link budgets is configured to determine whether a signal transmitted by a transmitter will reach a receiver with a signal-to-noise ratio that is above a pre-determined threshold.

39. The non-transitory computer readable storage medium of claim 31, wherein generating an RF coverage plan for the aircraft based on the determined one or more viable RF traffic resources for each geofence associated with a portion of the generated three-dimensional model comprises: for each geofence associated with a portion of the generated three-dimensional model, selecting a viable RF traffic resource of the determined one or more viable resources.

40. The non-transitory computer readable storage medium of claim 39, wherein selecting a viable RF traffic resource of the determined one or more viable resources is based on minimizing a number of times that the aircraft will switch traffic resources used during execution of the flight plan.

41. The non-transitory computer readable storage medium of claim 39, wherein selecting a viable RF traffic resource of the determined one or more viable resources is based on maximizing a signal-to-noise ratio associated with a communications channel between the base station and the aircraft.

42. The non-transitory computer readable storage medium of claim 31, wherein selecting a viable RF traffic resource of the determined one or more viable resources is based on maximizing the total number of aircraft using the communication system.

43. The non-transitory computer readable storage medium of claim 31, wherein selecting a viable RF traffic resource of the determined one or more viable resources is based on a RF link performance associated with another flight plan different from the received flight plan.

44. The non-transitory computer readable storage medium of claim 31, wherein the device is caused to notify a user who submitted the flight plan if it is determined that there are no viable RF traffic resources for a given geofence of the one or more geofences.

45. The non-transitory computer readable storage medium of claim 44, wherein the device is caused to generate a modification to the received plan if it is determined that there are no viable RF traffic resources for a given geofence of the one or more geofences.

* * * * *